(12) United States Patent
Oteri et al.

(10) Patent No.: US 12,199,912 B2
(45) Date of Patent: Jan. 14, 2025

(54) TECHNOLOGIES FOR SYNCHRONIZATION SIGNAL BLOCK MULTIPLEXING WITH DOWNLINK AND UPLINK TRANSMISSIONS

(71) Applicant: APPLE INC., Cupertino, CA (US)

(72) Inventors: Oghenekome Oteri, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Seyed Ali Akbar Fakoorian, San Diego, CA (US); Wei Zeng, Saratoga, CA (US)

(73) Assignee: APPLE INC., Cupertino, CA (US)

(*) Notice: Subject to any disclaimer, the term of this patent is extended or adjusted under 35 U.S.C. 154(b) by 240 days.

(21) Appl. No.: 17/441,798

(22) PCT Filed: Jan. 14, 2021

(86) PCT No.: PCT/CN2021/071775
§ 371 (c)(1),
(2) Date: Sep. 22, 2021

(87) PCT Pub. No.: WO2022/151159
PCT Pub. Date: Jul. 21, 2022

(65) Prior Publication Data
US 2023/0096490 A1    Mar. 30, 2023

(51) Int. Cl.
*H04L 5/00* (2006.01)
(52) U.S. Cl.
CPC .......... *H04L 5/0053* (2013.01); *H04L 5/0094* (2013.01)

(58) Field of Classification Search
CPC ... H04L 5/0007; H04L 5/0053; H04L 5/0094; H04L 27/26025; H04W 74/0808; H04W 74/0816; H04W 56/001
See application file for complete search history.

(56) References Cited

U.S. PATENT DOCUMENTS

| | | |
|---|---|---|
| 2019/0357252 A1* | 11/2019 | Sun ........................ H04W 72/23 |
| 2020/0214006 A1 | 7/2020 | Choi et al. |
| 2020/0252891 A1* | 8/2020 | Chendamarai Kannan ................. H04W 74/0808 |
| 2020/0281018 A1* | 9/2020 | Li .......................... H04W 80/08 |

(Continued)

FOREIGN PATENT DOCUMENTS

| | | |
|---|---|---|
| CN | 110167153 | 8/2019 |
| CN | 110972279 | 4/2020 |

(Continued)

OTHER PUBLICATIONS

International Preliminary Report on Patentability issued in PCT Application No. PCT/CN2021/071775, dated Jul. 27, 2023 in 6 pages.

(Continued)

*Primary Examiner* — Kan Yuen
(74) *Attorney, Agent, or Firm* — Kilpatrick Townsend & Stockton LLP

(57) ABSTRACT

The present application relates to devices and components including apparatus, systems, and methods of scheduling transmission of synchronization signal blocks (SSB) at a first subcarrier spacing (SCS) with uplink and downlink transmissions at a second SCS that is higher than the first SCS.

20 Claims, 20 Drawing Sheets

(56) References Cited

U.S. PATENT DOCUMENTS

| | | | | |
|---|---|---|---|---|
| 2020/0396744 | A1* | 12/2020 | Xiong | H04L 5/0051 |
| 2021/0007107 | A1 | 1/2021 | Peng | |
| 2021/0050976 | A1* | 2/2021 | Noh | H04L 5/0051 |
| 2021/0120585 | A1* | 4/2021 | Yang | H04W 74/008 |
| 2021/0218534 | A1 | 7/2021 | Liu et al. | |
| 2022/0104216 | A1* | 3/2022 | Wu | H04W 74/0891 |
| 2022/0132527 | A1* | 4/2022 | Cui | H04W 72/569 |
| 2022/0272650 | A1* | 8/2022 | Ko | H04W 76/28 |
| 2023/0155799 | A1* | 5/2023 | Shin | H04L 27/26025 370/329 |
| 2023/0164841 | A1* | 5/2023 | Talarico | H04L 27/0006 370/329 |

FOREIGN PATENT DOCUMENTS

| | | |
|---|---|---|
| CN | 111316731 | 6/2020 |
| CN | 111669238 | 9/2020 |
| CN | 111800244 | 10/2020 |
| WO | 2019059675 | 3/2019 |

OTHER PUBLICATIONS

Article entitled: "Discussion on Physical DL Channel Design in NR Unlicensed Spectrum", 3GPP TSG RAN WG1 Meeting #93, R1-1806084, dated May 2018 in 3 pages.

International Search Report and the Written Opinion issued in PCT Application No. PCT/CN2021/071775, dated Oct. 15, 2021 in 9 pages.

3GPP™ Work Item Description, entitled "New WID on Extending current NR operation to 71 GHz," Agenda Item: 9.1.1; Source: Qualcomm; 3GPP TSG RAN Meeting #86, RP-193229; Sitges, Spain, Dec. 9-12, 2019 in 5 pages.

Technical Report entitled "3rd Generation Partnership Project; Technical Specification Group Radio Access Network; Study on requirements for NR beyond 52.6 GHz (Release 16)," 3GPP TR 38.807 V16.0.0 (Dec. 2019); Keywords Ran, 5G, NR in 68 pages.

3GPP™ Work Item Description, entitled "Revised SID: Study on supporting NR from 52.6GHz to 71 GHZ," Agenda Item: 9.9.2; Source: Intel Corporation; 3GPP TSG-RAN Meeting #88e, RP-200902; (revision of RP-193259); Unique identifier: #860037; Electronic Meeting, Jun. 29- Jul. 3, 2020 in 3 pages.

3GPP™ Work Item Description, entitled "New SID: Study on supporting NR from 52.6GHz to 71 GHz," Agenda Item: 9.1.1; Source: Intel Corporation; 3GPP TSG RAN Meeting #86, RP-193259 (revision of RP-193258); Sitges, Spain, Dec. 9-12, 2019 in 3 pages.

Technical Specification entitled "3rd Generation Partnership Project; Technical Specification Group Radio Access Network; NR; Physical layer procedures for control (Release 16)," 3GPP TS 38.213 V16.4.0 (Dec. 2020); Keywords 3GPP, New Radio, Layer 1 in 181 pages.

Technical Specification entitled "3rd Generation Partnership Project; Technical Specification Group Radio Access Network; NR; Physical channels and modulation (Release 16)," 3GPP TS 38.211 V16.4.0 (Dec. 2020); Keywords New Radio, Layer 1 in 133 pages.

Technical Specification entitled "3rd Generation Partnership Project; Technical Specification Group Radio Access Network; Physical layer procedures for shared spectrum channel access (Release 16)," 3GPP TS 37.213 V16.4.0 (Dec. 2020); Keywords Radio layer 1 in 26 pages.

* cited by examiner

TECHNOLOGIES FOR SYNCHRONIZATION SIGNAL BLOCK MULTIPLEXING WITH DOWNLINK AND UPLINK TRANSMISSIONS

This application is a 35 U.S.C. § 371 National Stage Entry of International Application No. PCT/CN2021/071775, filed on Jan. 14, 2021, which is incorporated herein by reference in its entirety for all purposes.

BACKGROUND

It may be desired to extend Third Generation Partnership Project (3GPP) Fifth Generation (5G) New Radio (NR) to other frequency bands. Frequencies between 52.6 GHz and 71 GHz may be especially interesting because of, for example, their proximity to sub-52.6 GHz bands of the current NR system. It may also be desired to extend 3GPP NR to include use in unlicensed spectrum.

BRIEF DESCRIPTION OF THE DRAWINGS

FIG. 3 shows one example of scheduling SSB transmissions at 120 kHz SCS with 480 kHz SCS for data/control signals.

FIG. 5 shows one example of scheduling SSB transmissions at 240 kHz SCS with 480 kHz SCS for data/control signals.

FIGS. 7A and 7B show an example of scheduling SSB transmissions at 120 kHz SCS and data/control signals at 480 kHz SCS in accordance with some embodiments.

FIGS. 9A and 9B show an example of scheduling SSB transmissions at 240 kHz SCS and data/control signals at 480 kHz SCS in accordance with some embodiments.

DETAILED DESCRIPTION

Figure 1:
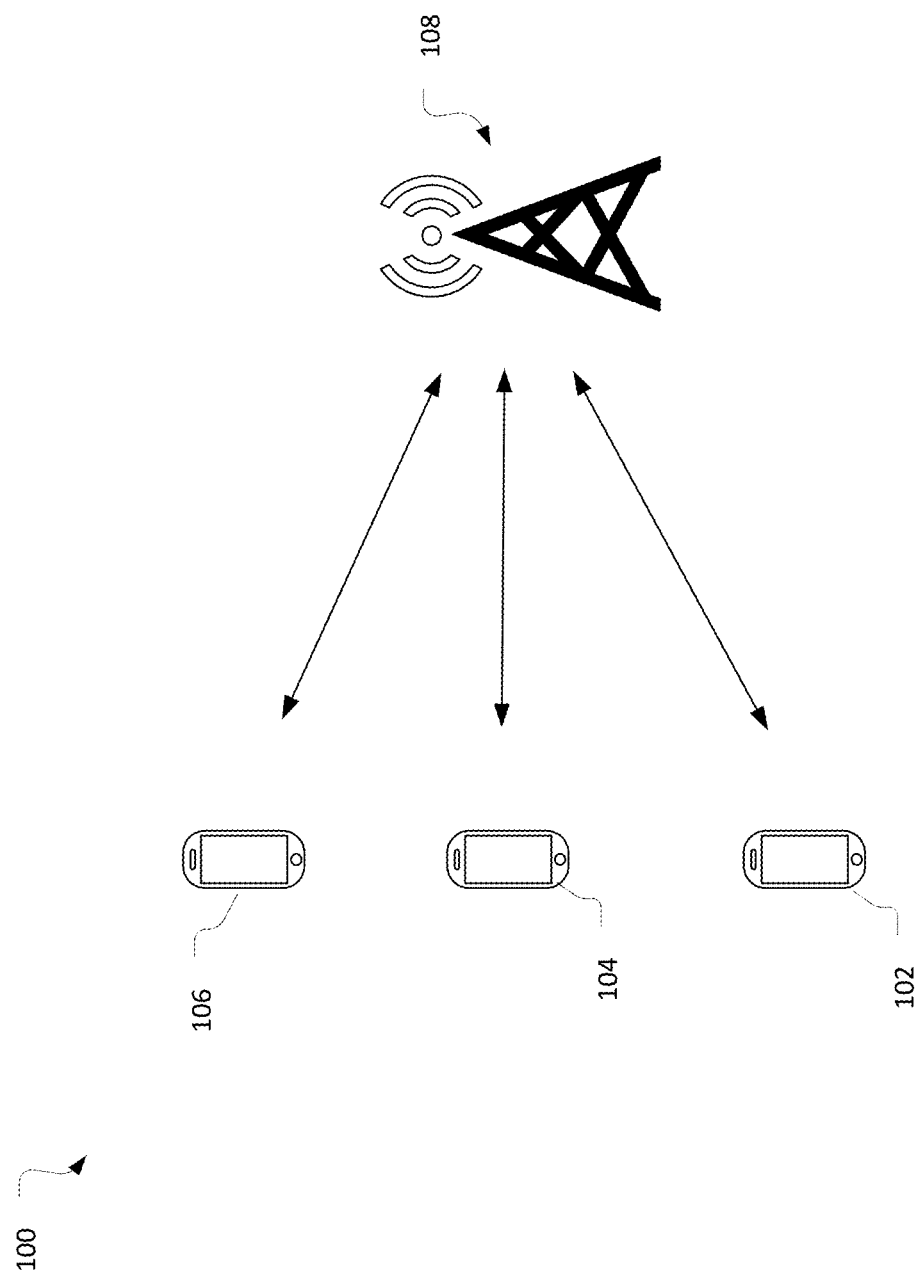
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include UEs 102, 104, and 106, and an access node 108. The access node 108 may be a base station that provides one or more wireless access cells, for example, 3GPP New Radio (NR) cells, through which one or more of the UEs 102/104/106 may communicate with the access node 108. In some aspects, the access node 108 is a Next Generation NodeB (gNB) that provides the 3GPP NR cell. The air interfaces over which the UEs 102/104/106 and access node 108 communicate may be compatible with 3GPP technical specifications (TSs) such as those that define Fifth Generation (5G) NR system standards and may occupy frequency bands in Frequency Range 1 (FR1) (e.g., below 7.225 GHz), Frequency Range 2 (FR2) (e.g., 24.250 GHz and above, also called mmWave), or higher frequency bands (e.g., between 52.6 GHz and 71 GHz or 114.25 GHz).

In 5G networks, the downlink carrier may be divided into a number of bandwidth parts (BWPs). Such division may facilitate the efficient provision of services in an environment in which different devices have different channel bandwidth capabilities. The BWP may include a set of contiguous common resource blocks.

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UEs 102/104/106 may use for initial access to a serving cell. The PBCH may be transmitted along with primary synchronization signal (PSS) and secondary synchronization signal (SSS) in a synchronization signal (SS)/PBCH block. The SS/PBCH blocks (SSBs) may be used by a UE 102/104/106 during a cell search procedure and for beam selection.

The PDSCH may be used to transfer end-user application data, signaling radio bearer (SRB) messages, system information messages (other than, for example, a Master Information Block (MIB)), and paging messages.

The access node 108 may use a PDCCH to transmit downlink control information (DCI) to the UEs 102/104/106. The DCI may provide uplink resource allocations on a physical uplink shared channel (PUSCH), downlink resource allocations on a PDSCH, and various other control information. The DCI may also be used to provide uplink power control commands, configure a slot format, or indicate that preemption has occurred.

A PDCCH may be configured by a control resource set (CORESET) that defines a set of resource blocks and number of symbols for the control channel. The access node 108 may transmit the scheduling PDCCHs using resource elements that belong to a control resource set (CORESET). A search space associated with the CORESET may configure the time of the control channel, for example, periodicity, offset, etc. The search space configuration may refer to a particular CORESET to define a search space, for example, a specific set of resource blocks and symbols where the UE 102/104/106 is to attempt to decode the PDCCH. The access node 108 may configure up to three CORESETs for an active downlink bandwidth part of a serving cell. The CORESET may be configured by a ControlResourceSet information element that defines frequency domain resources to indicate resource blocks allocated to the CORESET, a duration to indicate a number of symbols allocated to the CORESET (which may be 1, 2, or 3 orthogonal frequency division multiplexing (OFDM) symbols), and quasi-co-location (QCL) information to support a successful reception of the PDCCH.

A CORESET having an identity zero (CORESET 0) may be configured by a controlResourceSetZero information element within a master information block (MIB) and within a ServingCellConfigCommon parameter structure. CORESET 0 may be associated with an initial downlink BWP.

The initial downlink BWP may be configured by an initialDownlinkBWP parameter transmitted in system information block 1 (SIB 1). The UEs 102/104/106 may use the initial downlink BWP when first accessing a cell provided by the access node 108. The access node 108 may use dedicated signaling to configure up to four additional downlink BWPs per cell.

The PDSCH may be used to transfer application data, signaling radio bearer (SRB) messages, system information and paging messages. Providing reliable PDSCH reception is an objective of a network system design. Such an objective may be especially the case for providing services such as ultra-reliable and low-latency communication (URLLC) service, which is a target use case of NR networks.

The access node (e.g., base station or gNB) 108 may also transmit various reference signals to the UEs 102/104/106. A reference signal is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. A UE 102/104/106 may compare a received version of the DMRS with a known DMRS sequence that was transmitted to estimate an impact of the propagation channel. The UE 102/104/106 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 102/104/106 to determine the desired downlink beam pair for transmitting/receiving physical downlink control channel (PDCCH) and physical downlink shared channel (PDSCH) transmissions.

The PUCCH may be used to transmit uplink control information (UCI) including, for example, hybrid-automatic repeat request (HARQ) acknowledgements, scheduling requests, and periodic and semi-persistent channel state information (CSI) reports. The PUSCH may be used to transfer user data in the user plane and signaling radio bearer (SRB) messages in the control plane. The PUSCH may also be used to transfer various control information such as, for example, buffer status reports, cell-radio network temporary identifiers (C-RNTIs), configured grant configuration, and power headroom reports.

It may be desired to extend 5G NR to other frequency bands. For example, NR beyond 52.6 GHz up to 114.25 GHz may be considered. Frequencies between 52.6 GHz and 71 GHz are especially interesting in the short term, because of their proximity to sub-52.6 GHz (current NR system) and imminent commercial opportunities for high data rate communications, e.g., (un)licensed spectrum between 57 GHz and 71 GHz. 5G NR in unlicensed spectrum (NR-U) provides for both license-assisted and standalone use of unlicensed spectrum.

For implementing such extension, it may be desirable to leverage Frequency Range 2 (FR2) design to the extent possible. For example, it may be beneficial to use aspects of existing waveforms (e.g., existing downlink (DL)/uplink (UL) NR waveform) to support operation at frequencies between 52.6 GHz and 71 GHz and beyond if feasible, to take advantage of such opportunities by minimizing specification burden and required changes and maximizing the leverage of FR2-based implementations. Such aspects may include applicable numerology including subcarrier spacing (SCS), channel BW (including maximum), and their impact to FR2 physical layer design to support system functionality considering, for example, practical radio-frequency (RF) impairments; channel access mechanism assuming beam-based operation in order to comply with the regulatory requirements applicable to unlicensed spectrum for frequencies between 52.6 GHz and 71 GHz, etc.

In the physical layer, it may be desired to consider new numerology or numerologies (e.g., μ value in 3GPP TS 38.211, version 16.3.0, Release 16 (2020-11)) for operation in this frequency range. Impact on physical signals/channels, if any, may also be addressed. For example, timeline-related aspects adapted to each of the new numerologies may be considered (e.g., BWP and beam switching times, HARQ scheduling, UE processing, preparation and computation times for PDSCH, PUSCH/SRS and CSI, respectively). It may be desired to support up to 64 SSB beams for licensed and unlicensed operation in a frequency range between 52.6 GHz and 71 GHz. It may be desired to consider SSB patterns, and multiplexing of SSBs with Control Resource Set (CORESET) and UL transmissions. It may be desired to use a bandwidth part (BWP) that can operate with 480 kHz SCS for data/control/reference signals and 240 kHz SCS for SSB, for example. It may be desired to support contention-exempt short control signaling transmission (e.g., in 60 GHz band) for regions where listen-before-talk (LBT) is required and short control signaling without LBT is allowed.

One possible solution that may be considered is that an initial BWP (e.g., assuming standalone) can be operated using FR2 numerologies. The BWP can be switched to a larger numerology based on data rate needs. This BWP can operate with 480 kHz SCS for data/control/reference signals and 240 kHz SSB, for example.

Figure 2:
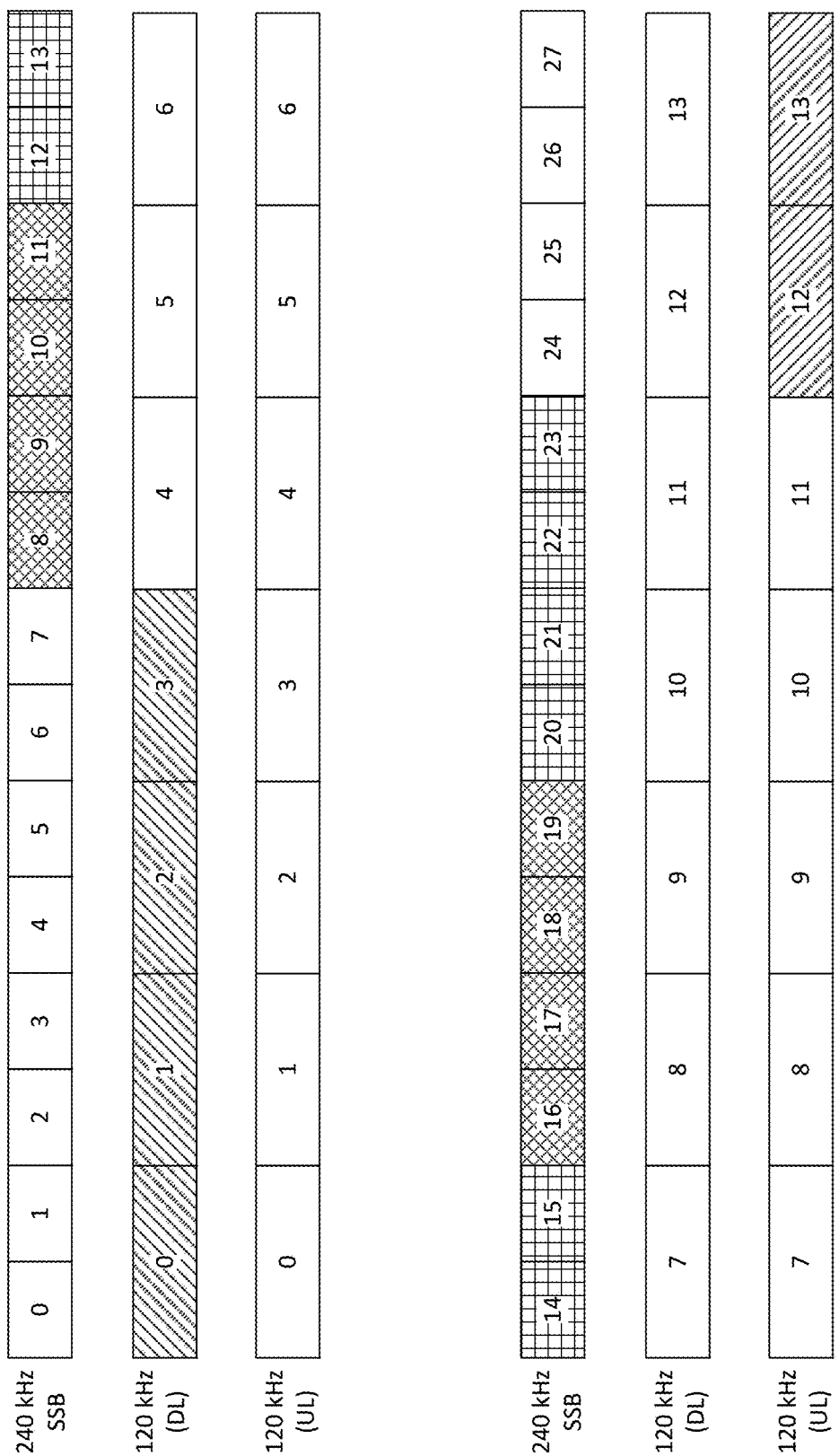
FIG. 2 shows one example of scheduling SSB transmissions at 240 kHz SCS with 120 kHz SCS for data/control signals.

A current 240 kHz SCS pattern allows for transmission of CORESET and UL PUCCH for data at 120 kHz SCS (e.g., a mixed numerology). Transmission of the CORESET (e.g., over the PDCCH) covers up to 3 symbols at the beginning of the slot, while the UL PUCCH transmission may occur either in the middle or end of the slot. FIG. 2 shows one example of scheduling such transmissions over a time period that includes two fourteen-symbol slots at 240 kHz SCS (the 28 symbols being labeled in order of time from 0 to 27) and one fourteen-symbol slot at 120 kHz SCS. In this example, four four-symbol SSBs are transmitted consecutively at 240 kHz SCS from symbols 8 to 23, the DL transmission of the CORESET occupies symbols 0-3 of the slot at 120 kHz SCS, and the UL (PUCCH) transmission occupies symbols 12 and 13 of the slot at 120 kHz SCS. It can be seen in FIG. 2 that no collisions occur among these transmissions.

Problems may arise, however, when the SCS for SSB is larger than the SCS for data signals: for example, 240 kHz SCS for SSB and 480 kHz or 960 kHz SCS for data, or 120 kHz SCS for SSB and 480 kHz or 960 kHz SCS for data. In such cases, the SSBs may collide with UL (PUCCH) transmission and/or DL (CORESET) transmission. Problems may also arise in an unlicensed medium if there is a symbol gap between consecutive SS/PBCH blocks. Depending on the SCS, if there is no transmission, such a gap may result in a loss of the medium to a competing network (whether inter-radio access technology (RAT) (e.g., 5G vs. Wi-Fi) or intra-RAT (5G vs 5G)).

Figure 3:
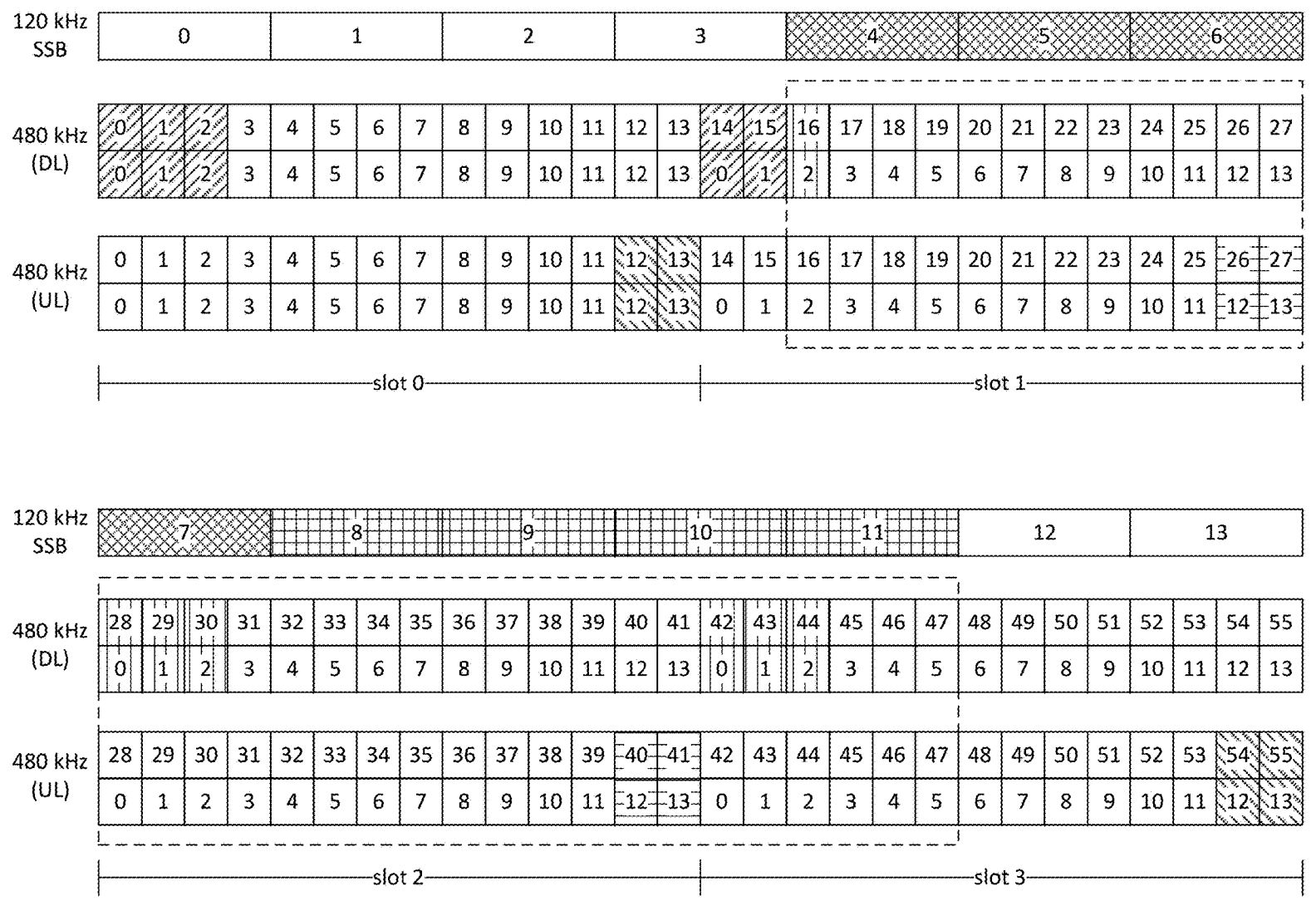

FIG. 3 shows an example of an SSB pattern as specified (e.g., in 3GPP Technical Specification (TS) 38.213, version 16.3.0, Release 16 (2020-11)) for a 120 kHz SCS over a 14-symbol slot, with the symbols being labeled 0-13 from left to right. In this example, each SSB is four symbols long, with the first SSB occupying symbols 4-7 and the second SSB occupying symbols 8-11. These symbol assignments correspond to the following SSB pattern for an SSB burst as specified in TS 38.213: {4, 8, 16, 20}+28×n, where n=0, 1, 2, . . . .

FIG. 3 also shows an example of DL (CORESET) and UL (PUCCH) transmissions over the same time period at 480 kHz SCS. The 56 symbols of the four corresponding slots in the time period are labeled in order of time, with the top row for each transmission showing a relative slot index of from 0 to 55, and the bottom row showing an absolute slot index of from 0 to 13 which repeats four times. DL (CORESET) transmissions are scheduled to occur at symbols 0-2, 14-16, 28-30, and 42-44, and UL (PUCCH) transmissions are scheduled to occur at symbols 12-13, 26-27, 40-41, and 54-55. Due to collision with the SSBs, however (as illustrated in FIG. 3 by the dashed boxes), DL transmissions at symbols 16, 28-30, and 42-44 are invalid, and UL transmissions at symbols 26-27 and 40-41 are invalid.

Figure 4:
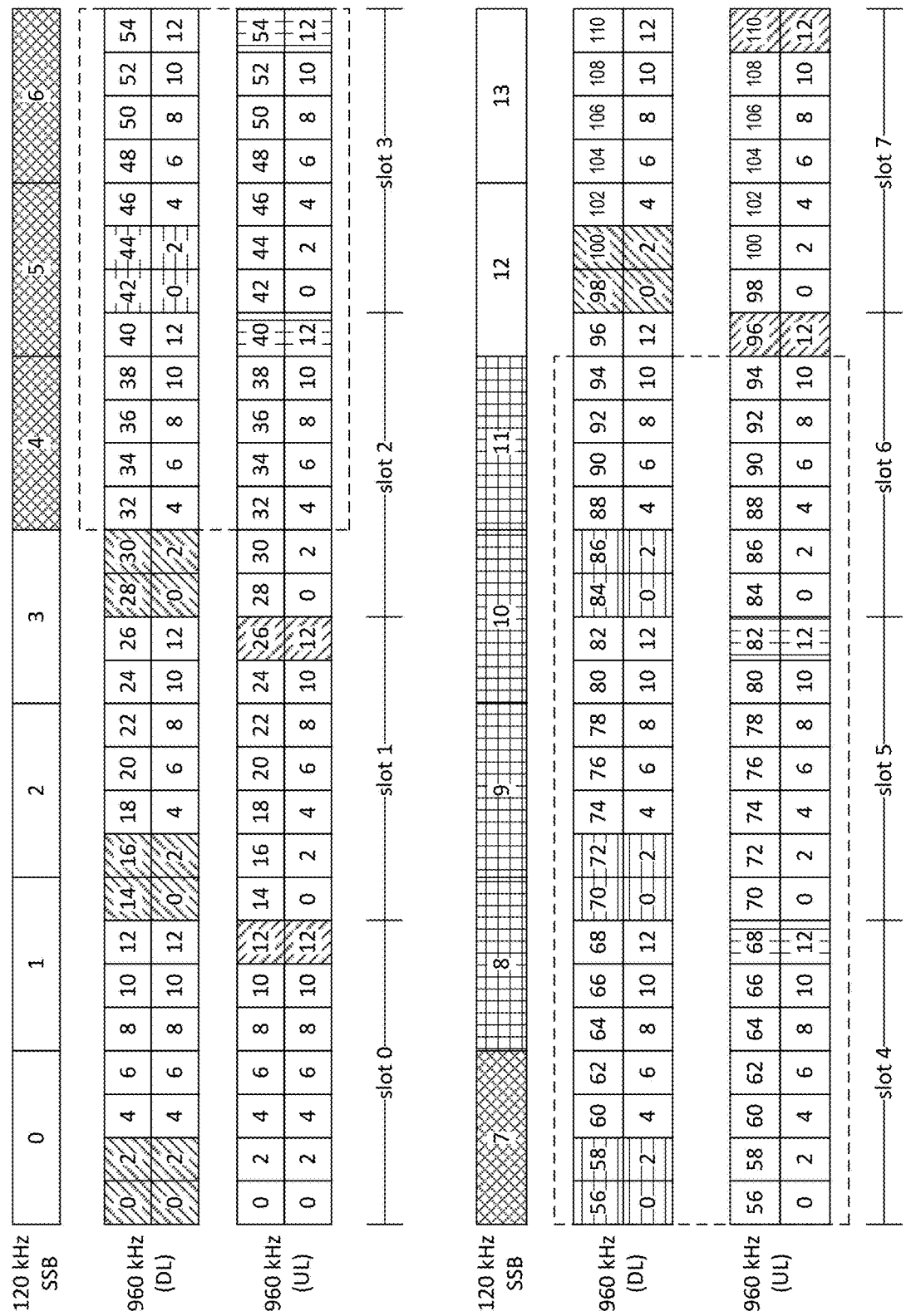
FIG. 4 shows one example of scheduling SSB transmissions at 120 kHz SCS with 960 kHz SCS for data/control signals.

FIG. 4 shows an example of the same SSB pattern for a 120 kHz SCS over a 14-symbol slot, with an example of DL (CORESET) and UL (PUCCH) transmissions over the same time period at 960 kHz SCS. Of the 112 symbols of the eight corresponding slots 0-7 in the time period, the even-numbered symbols are shown and labeled in order of time, with the top row for each transmission showing a relative slot index of from 0 to 110, and the bottom row showing an absolute slot index of from 0 to 12, which repeats eight times. DL (CORESET) transmissions are scheduled to occur at symbols 0-3 of each slot, and UL (PUCCH) transmissions are scheduled to occur at symbols 12-13 of each slot. Due to collision with the SSBs, however (as illustrated in FIG. 4 by the dashed boxes), DL transmissions at symbols 42-45, 56-59, 70-73 and 84-87 are invalid, and UL transmissions at symbols 40, 54, 68, and 82 are invalid.

Figure 5:
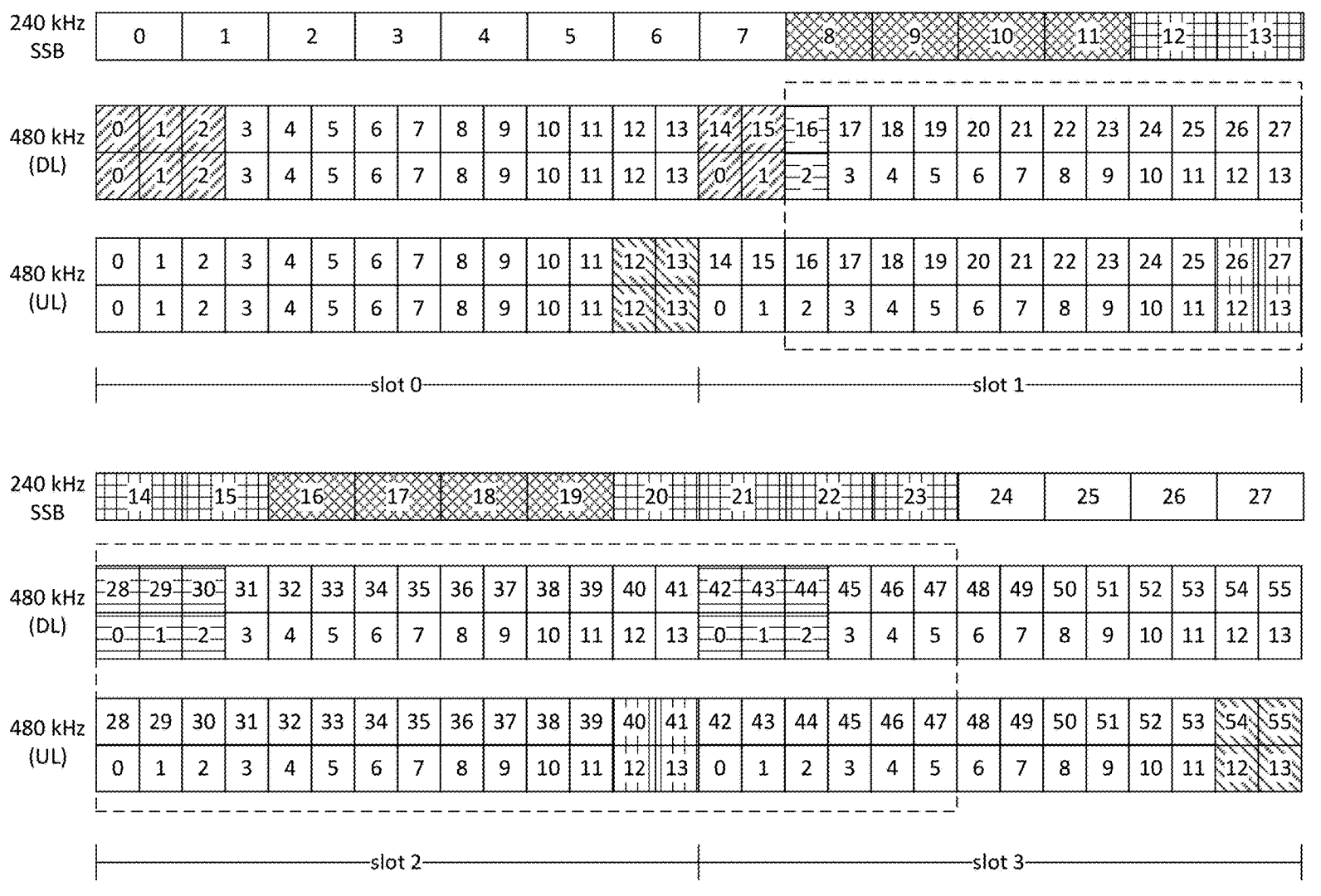

FIG. 5 shows an example of an SSB pattern as specified (e.g., in 3GPP TS 38.213 v16.3.0) for a 240 kHz SCS over two 14-symbol slots, with the symbols being labeled in order of time from 0 to 27. In this example, each SSB is four symbols long, with the four SSBs occupying symbols 8-11, 12-15, 16-19, and 20-23, respectively.

FIG. 5 also shows an example of DL (CORESET) and UL (PUCCH) transmissions over the same time period at 480 kHz SCS. The 56 symbols of the four corresponding slots in the time period are labeled in order of time, with the top row for each transmission showing a relative slot index of from 0 to 55, and the bottom row showing an absolute slot index of from 0 to 13, which repeats four times. DL (CORESET) transmissions are scheduled to occur at symbols 0-2, 14-16, 28-30, and 42-44, and UL (PUCCH) transmissions are scheduled to occur at symbols 12-13, 26-27, 40-41, and 54-55. As for the SSB pattern at 120 kHz SCS as shown in FIG. 3, due to collision with the SSBs (as illustrated in FIG. 5 by the dashed boxes), DL transmissions at symbols 16, 28-30, and 42-44 are invalid, and UL transmissions at symbols 26-27 and 40-41 are invalid.

Figure 6:
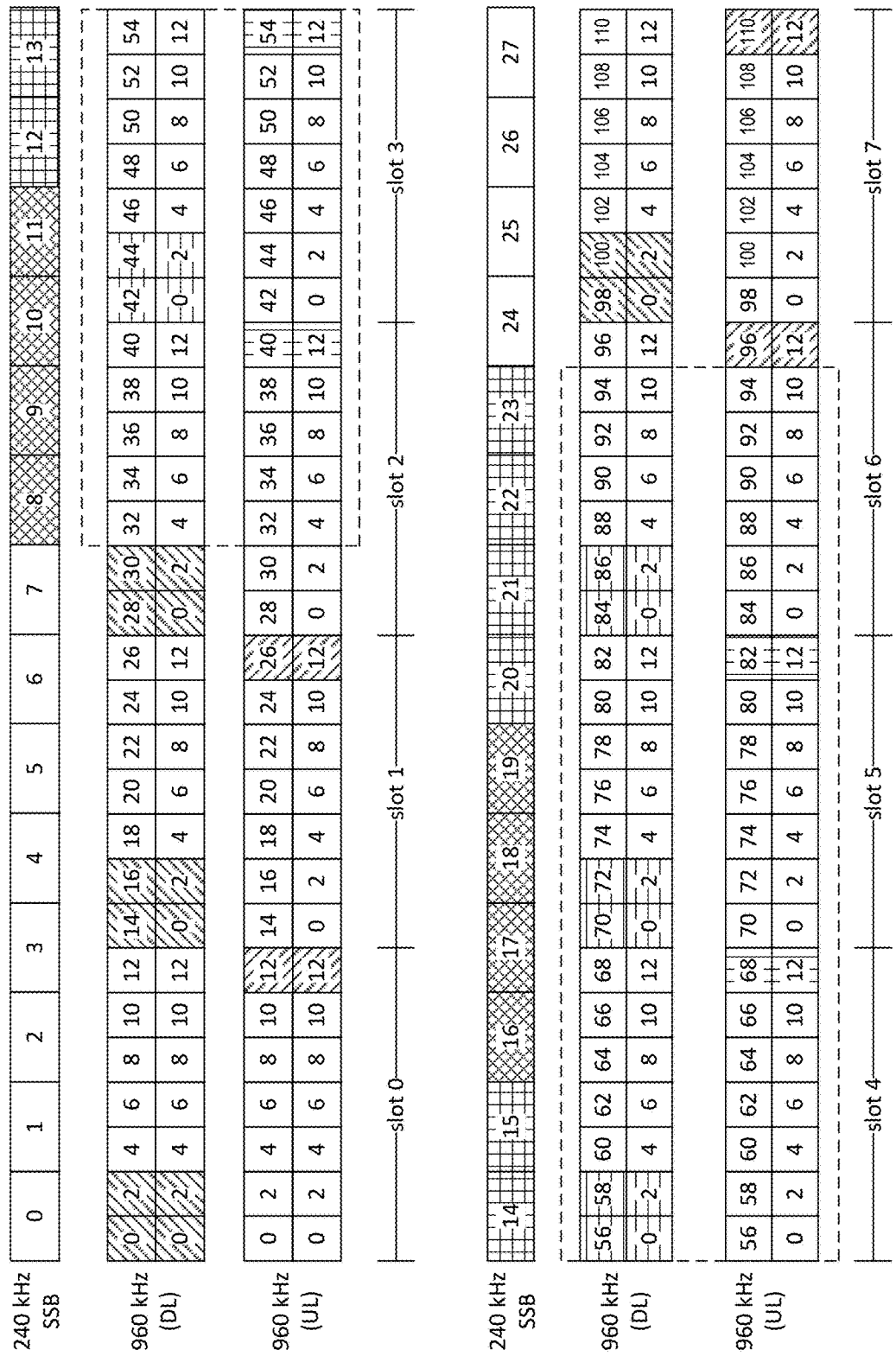
FIG. 6 shows one example of scheduling SSB transmissions at 240 kHz SCS with 960 kHz SCS for data/control signals.

FIG. 6 shows an example of the same SSB pattern for a 240 kHz SCS over two 14-symbol slots as shown in FIG. 5, with an example of DL (CORESET) and UL (PUCCH) transmissions over the same time period at 960 kHz SCS. Of the 112 symbols of the eight corresponding slots 0-7 in the time period, the even-numbered symbols are shown and labeled in order of time, with the top row for each transmission showing a relative slot index of from 0 to 110, and the bottom row showing an absolute slot index of from 0 to 12 which repeats eight times. DL (CORESET) transmissions are scheduled to occur at symbols 0-3 of each slot, and UL (PUCCH) transmissions are scheduled to occur at symbols 12-13 of each slot. As for the SSB pattern at 120 kHz SCS as shown in FIG. 4, due to collision with the SSBs (as illustrated in FIG. 6 by the dashed boxes), DL transmissions at symbols 42-45, 56-59, 70-73 and 84-87 are invalid, and UL transmissions at symbols 40, 54, 68, and 82 are invalid.

Embodiments are now described in which the SSB pattern is modified to account for UL transmission and CORESET with multi-slot data transmission. Such embodiments may also allow multi-slot scheduling and multi-slot PUCCH resources to enable avoidance of CORESET/PUCCH mismatch.

Figure 7A:
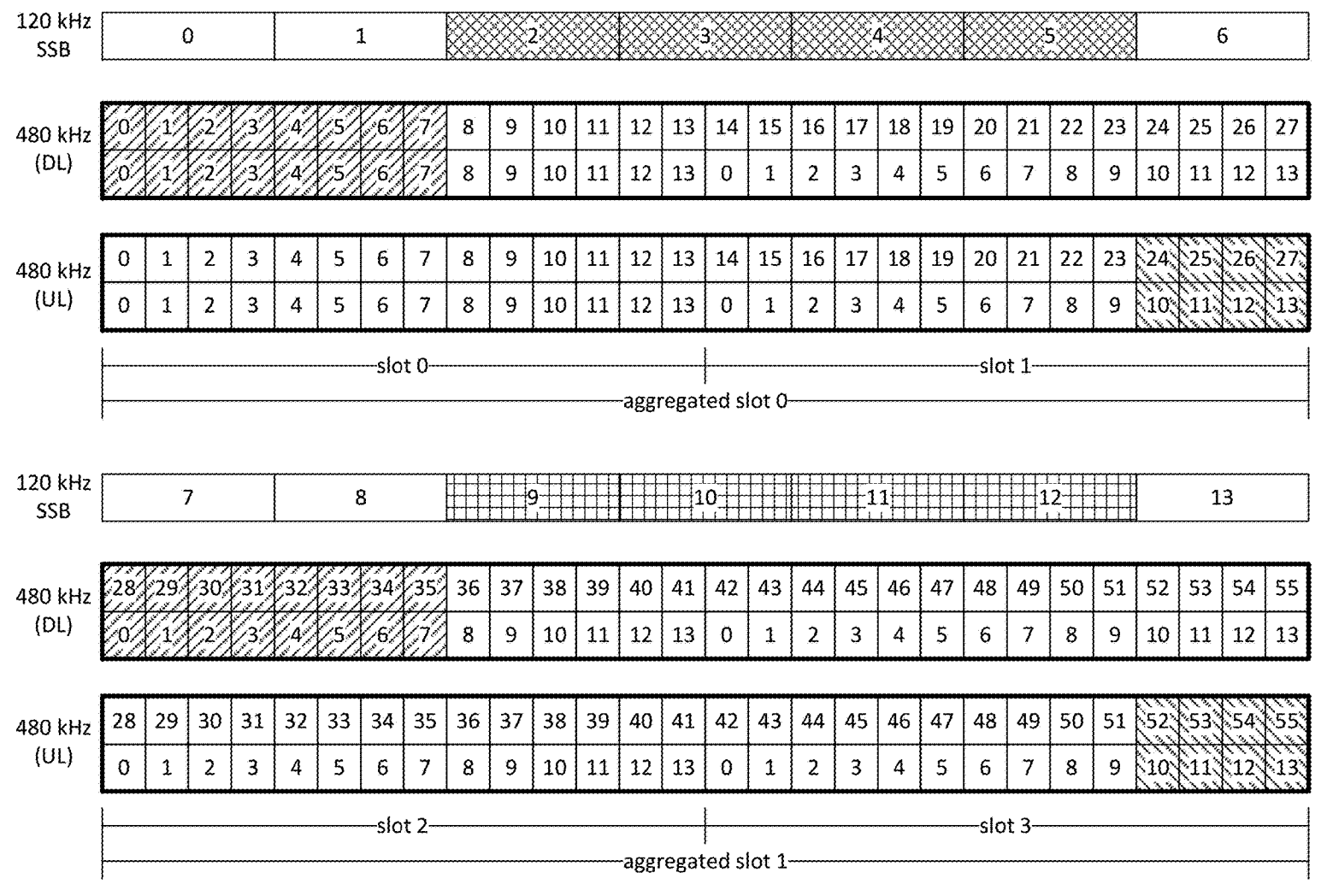
Figure 7B:
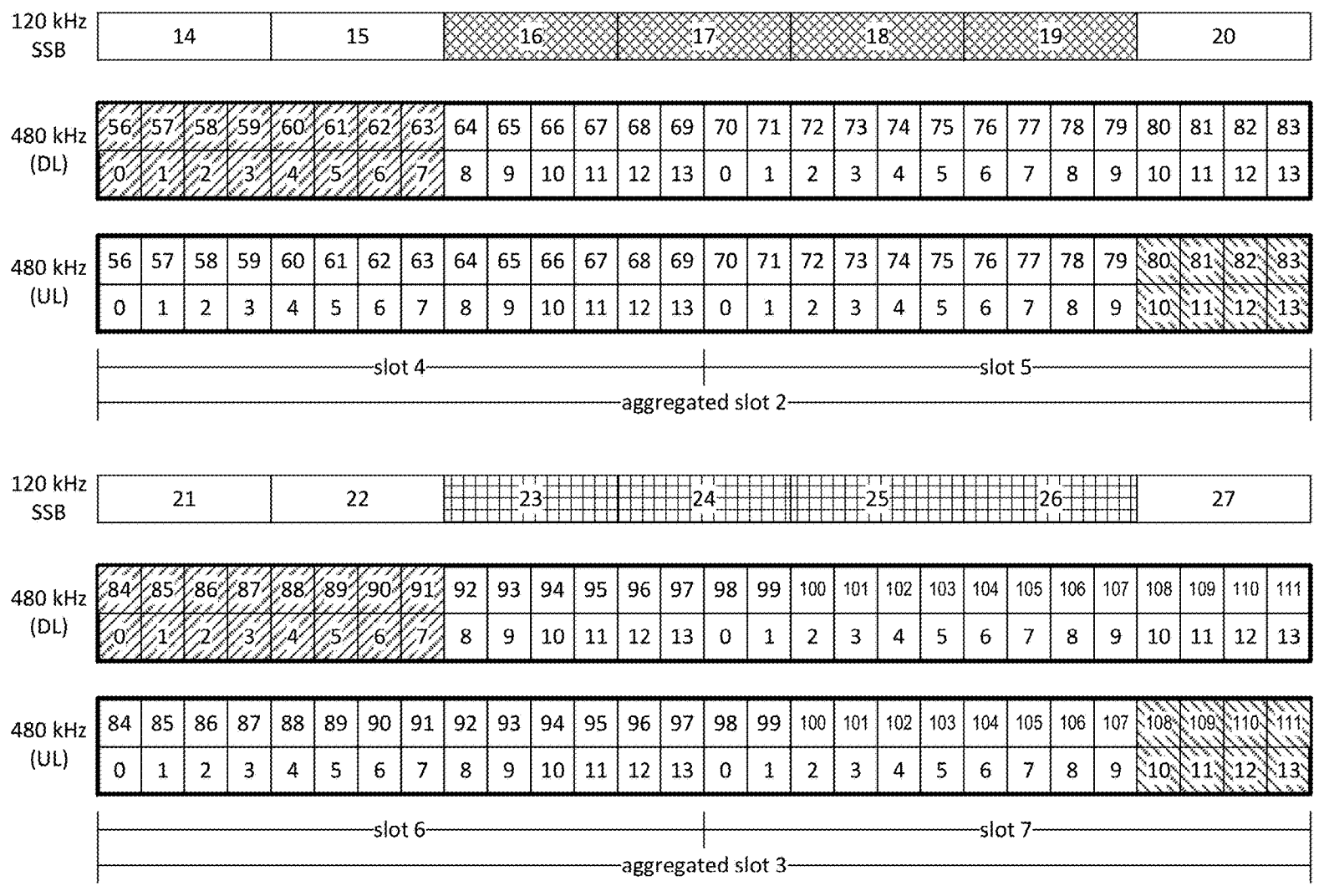

FIGS. 7A and 7B show a novel SSB pattern for a 120 kHz SCS over two consecutive 14-symbol slots, with the 28 symbols being labeled in order of time from 0 to 27. In this example, each SSB is four symbols long, with the first and second SSBs occupying symbols 2-5 and 9-12 of the first slot, respectively, and the third and fourth SSBs occupying symbols 16-19 and 23-26, respectively, in the second slot. These symbol assignments correspond to an SSB pattern for an SSB burst in which the candidate symbols for starting an SSB are specified in the following expression: {2, 9, 16, 23}+28×n, where n=0, 1, 2, . . . .

FIGS. 7A and 7B also show an example of DL (CORESET) and UL (PUCCH) transmissions over the same time period at 480 kHz SCS. The 112 symbols of the eight corresponding slots in the time period are labeled in order of time, with the top row for each transmission showing a relative slot index of from 0 to 111, and the bottom row showing an absolute slot index of from 0 to 13 which repeats eight times. For 480 kHz SCS for control/data, scheduling may be performed using two-slot aggregation, such that a UE transmitting control/data signals at 480 kHz SCS and monitoring SSBs at 120 kHz SCS expects to be scheduled with slot granularity of multiples of 2 for the duration of an SSB burst. In a first option, a UE may be scheduled with this scheduling granularity for the duration of the BWP for control/data signals. In a second option, a UE may switch to this granularity only during the transmission of an SSB burst.

In the example of FIGS. 7A and 7B, two-slot aggregation is applied such that each slot is aggregated with a neighboring slot to form an aggregated slot. As indicated in these figures, for example, slots 0 and 1 are aggregated to form a first aggregated slot 0, slots 2 and 3 are aggregated to form a second aggregated slot 1, slots 4 and 5 are aggregated to form a third aggregated slot 2, and slots 6 and 7 are aggregated to form a fourth aggregated slot 3.

The example shown in FIGS. 7A and 7B allows for p>=3 symbols at the beginning of the aggregated slot for CORE-SET transmission (e.g., at symbols 0, 1, 2, 3 and also 4, 5, 6, 7) and allows for s>=2 symbols at the middle/end of the aggregated slot for PUCCH transmission (e.g., at symbols 10, 11 in addition to 12, 13). In this example, the SSB pattern is such that there are 3 symbols between SSBs that enable this multiplexing (e.g., fits in 5 subframes).

In aggregated slot 0, DL (CORESET) transmissions are scheduled to occur in an extended period during the first eight symbols of the aggregated slot, and UL (PUCCH) transmissions are scheduled to occur in an extended period during the last four symbols of the aggregated slot. In aggregated slot 1 (and in subsequent slots during the same SSB burst), DL (CORESET) transmissions are scheduled to occur in an extended period during the first eight symbols of the aggregated slot, and UL (PUCCH) transmissions are scheduled to occur in an extended period during the last four symbols of the aggregated slot. FIGS. 7A and 7B do not show the invalid UL and DL transmissions (e.g., UL at symbols 14-16, 42-44, 70-72, and 98-100; DL at 12-13, 40-41, 68-69, and 96-97) that would be scheduled under single-slot scheduling.

Figure 8A:
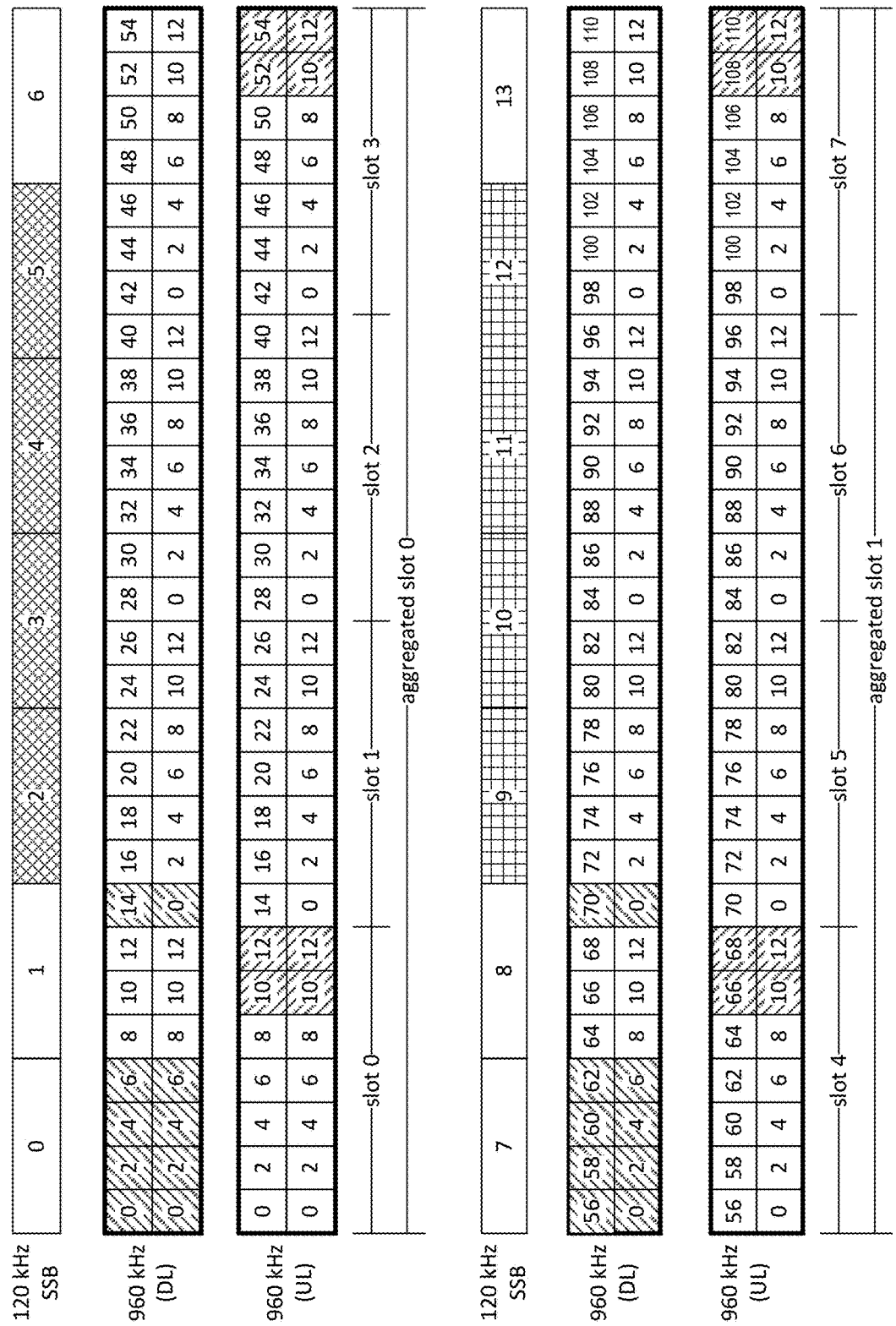
FIGS. 8A and 8B show an example of scheduling SSB transmissions at 120 kHz SCS and data/control signals at 960 kHz SCS in accordance with some embodiments.
Figure 8B:
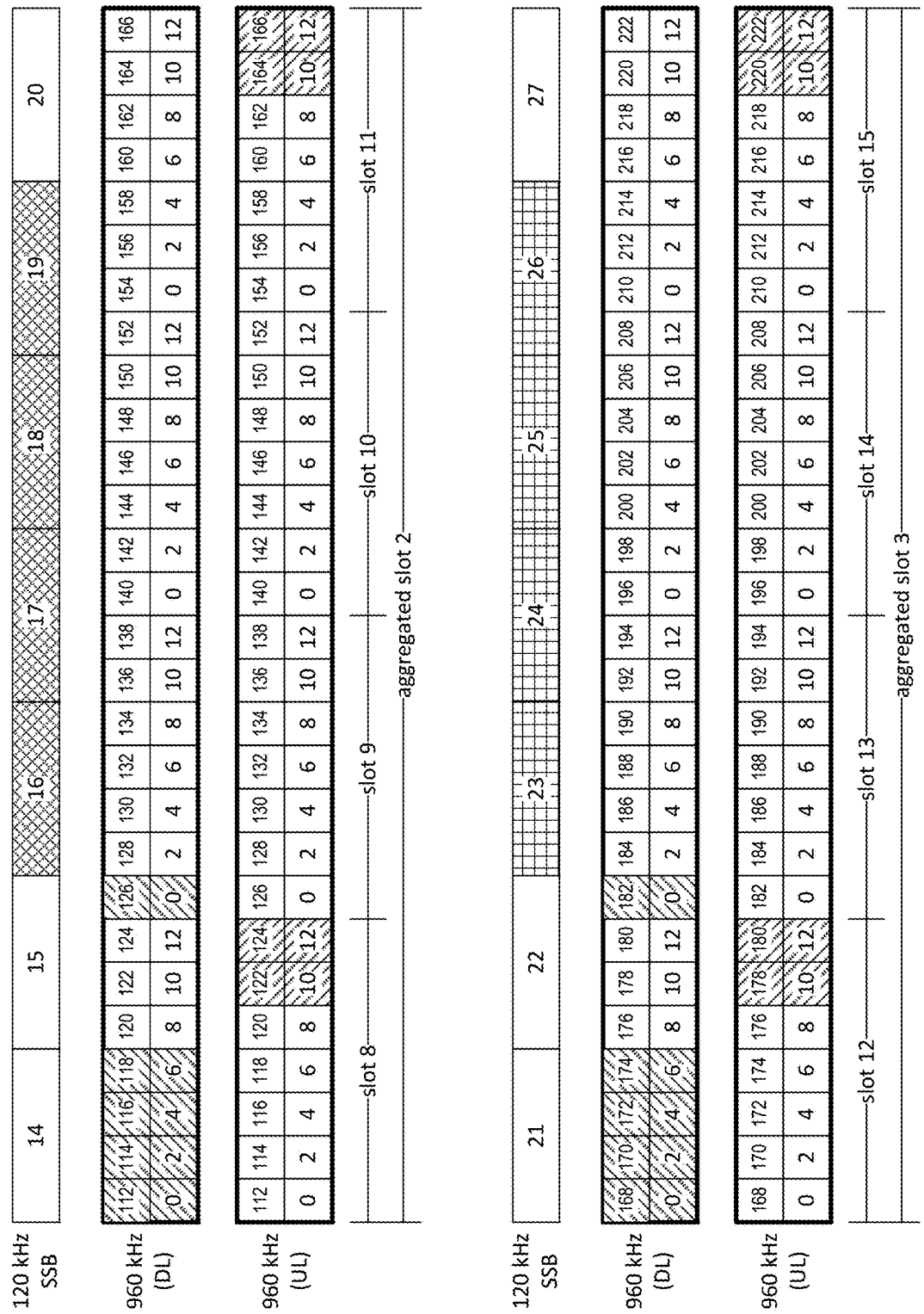

FIGS. 8A and 8B show the novel SSB pattern for a 120 kHz SCS over two consecutive 14-symbol slots as shown in the example of FIGS. 7A and 7B. FIGS. 8A and 8B also show an example of DL (CORESET) and UL (PUCCH) transmissions over the same time period at 960 kHz SCS. The 224 symbols of the 16 corresponding slots in the time period are labeled in order of time, with the top row for each transmission showing a relative slot index of from 0 to 222, and the bottom row showing an absolute slot index of from 0 to 13 which repeats sixteen times. For 960 kHz SCS for control/data, scheduling may be performed using four-slot aggregation, such that a UE transmitting control/data signals at 960 kHz SCS and monitoring SSBs at 120 kHz SCS expects to be scheduled with slot granularity of multiples of 4 for the duration of an SSB burst. In a first option, a UE may be scheduled with this scheduling granularity for the duration of the BWP for control/data signals. In a second option, a UE may switch to this granularity only during the transmission of an SSB burst.

In the example of FIGS. 8A and 8B, four-slot aggregation is applied such that each group of four slots is aggregated to form an aggregated slot. As indicated in these figures, for example, slots 0 to 3 are aggregated to form a first aggregated slot 0, slots 4 to 7 are aggregated to form a second aggregated slot 1, slots 8 to 11 are aggregated to form a third aggregated slot 2, and slots 12 to 15 are aggregated to form a fourth aggregated slot 3. In aggregated slot 0, DL (CORESET) transmissions are scheduled to occur in an extended period during the first eight symbols of the aggregated slot and also at the first two symbols of the second slot in the aggregated slot, and UL (PUCCH) transmissions are scheduled to occur in an extended period during the last four symbols of the aggregated slot. In aggregated slot 1 (and in subsequent slots during the same SSB burst), DL (CORESET) transmissions are scheduled to occur in an extended period during the first eight symbols of the aggregated slot and also at the first two symbols of the second slot in the aggregated slot, and UL (PUCCH) transmissions are scheduled to occur in an extended period during the last four symbols of the aggregated slot. FIGS. 8A and 8B do not show the invalid UL and DL transmissions (e.g., UL at symbols 16, 28-30, 42-44, 72, 84-86, 98-100, 128, 140-142, 154-156, 184, 196-198, and 210-212; DL at 26-27, 40-41, 82-83, 96-97, 138-139, 152-153, 194-195, and 208-209) that would be scheduled under single-slot scheduling.

Figure 9A:
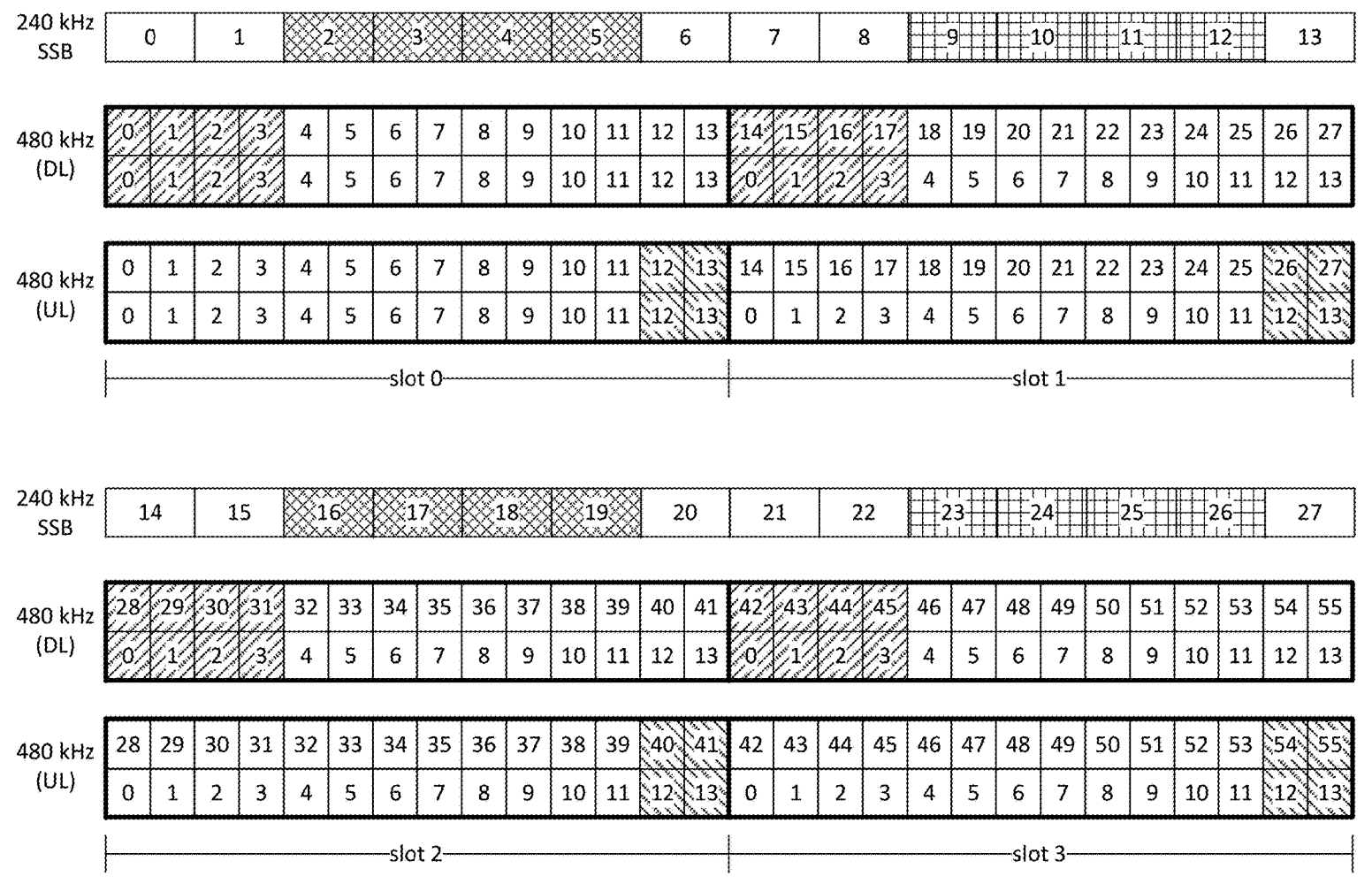
Figure 9B:
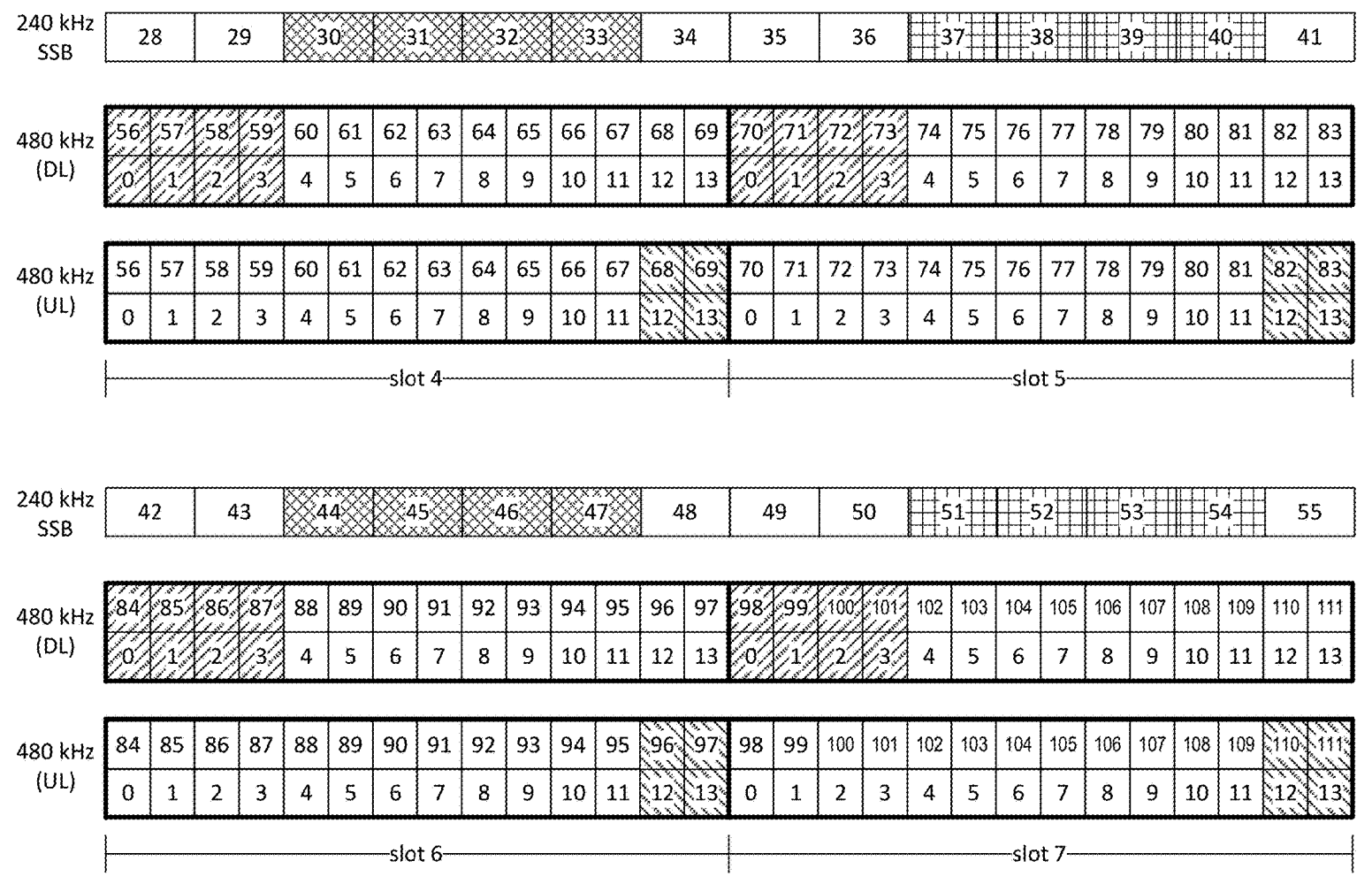

FIGS. 9A and 9B show a novel SSB pattern for a 240 kHz SCS over four consecutive 14-symbol slots, with the 56 symbols being labeled in order of time from 0 to 55. In this example, each SSB is four symbols long, with the first and second SSBs occupying symbols 2-5 and 9-12 of the first slot, respectively; the third and fourth SSBs occupying symbols 16-19 and 23-26, respectively, in the second slot; the fifth and sixth SSBs occupying symbols 30-33 and 37-40, respectively, in the second slot; and the seventh and eighth SSBs occupying symbols 44-47 and 51-54, respectively, in the second slot. These symbol assignments correspond to an SSB pattern for an SSB burst in which the candidate symbols for starting an SSB are specified in the following expression: {2, 9, 16, 23, 30, 37, 44, 53}+56×n, where n=0, 1, 2, . . . .

FIGS. 9A and 9B also show an example of DL (CORESET) and UL (PUCCH) transmissions over the same time period at 480 kHz SCS. The 112 symbols of the eight corresponding slots in the time period are labeled in order of time, with the top row for each transmission showing a relative slot index of from 0 to 111, and the bottom row showing an absolute slot index of from 0 to 13 which repeats eight times. For 480 kHz SCS for control/data, scheduling may be performed using one-slot aggregation, such that a UE transmitting control/data signals at 480 kHz SCS and monitoring SSBs at 120 kHz SCS expects to be scheduled with slot granularity of multiples of 1 for the duration of an SSB burst (e.g., no slot-based scheduling needed). In a first option, a UE may be scheduled with this scheduling granularity for the duration of the BWP for control/data signals. In a second option, a UE may switch to this granularity only during the transmission of an SSB burst.

The example shown in FIGS. 9A and 9B allows for p>3 symbols at the beginning of the aggregated slot for CORE-SET transmission (e.g., at symbols 0, 1, 2, 3) and allows for s=2 symbols at middle/end of the aggregated slot for PUCCH transmission (e.g., at symbols 12, 13). In this example, the SSB pattern is such that there are 3 symbols between SSBs that enable this multiplexing (e.g., fits in 3 subframes). In the example of FIGS. 9A and 9B, DL (CORESET) transmissions are scheduled to occur during the first four symbols of each slot, and UL (PUCCH) transmissions are scheduled to occur in an extended period during the last two symbols of each slot.

Figure 10A:
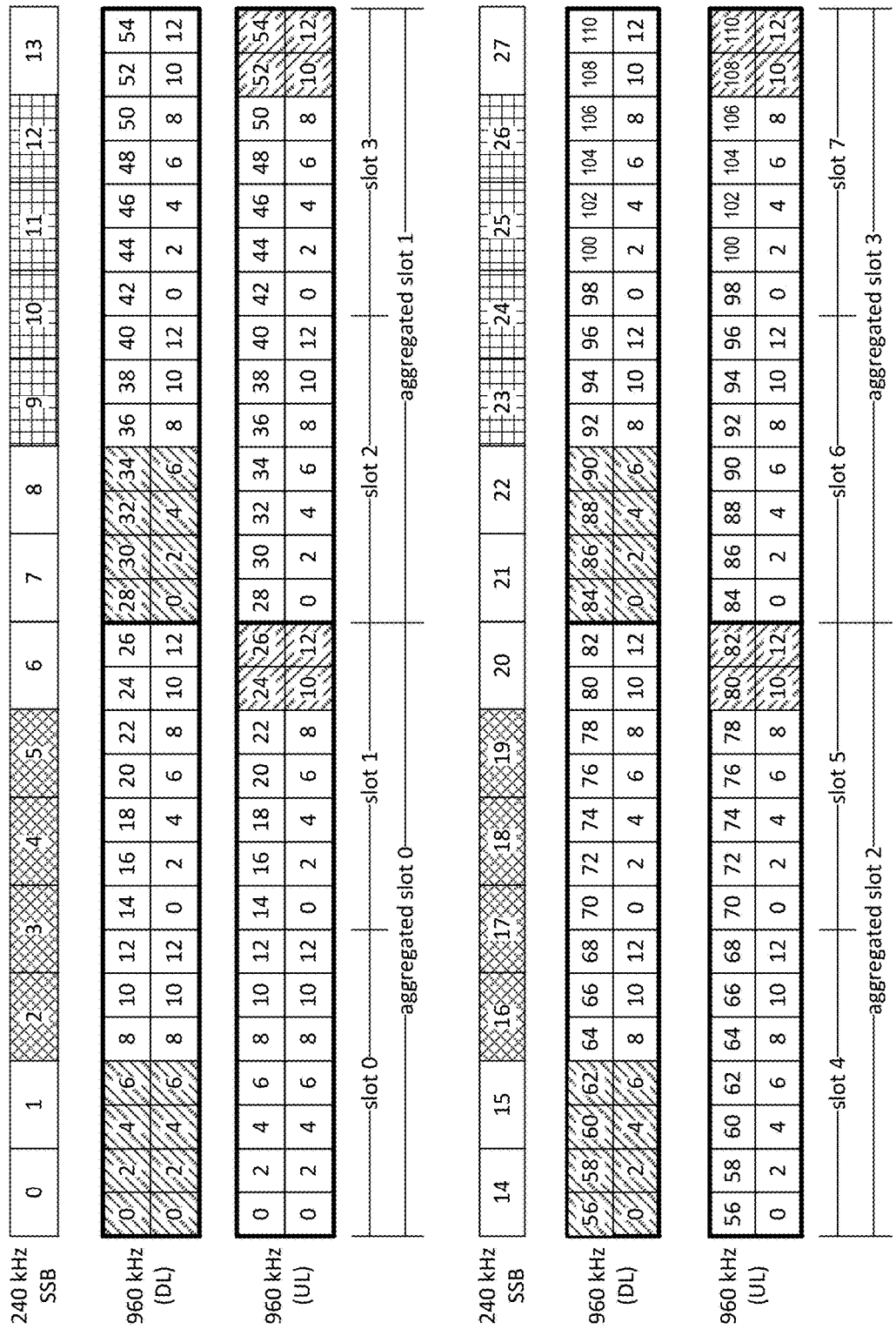
FIGS. 10A and 10B show an example of scheduling SSB transmissions at 240 kHz SCS and data/control signals at 960 kHz SCS in accordance with some embodiments.
Figure 10B:
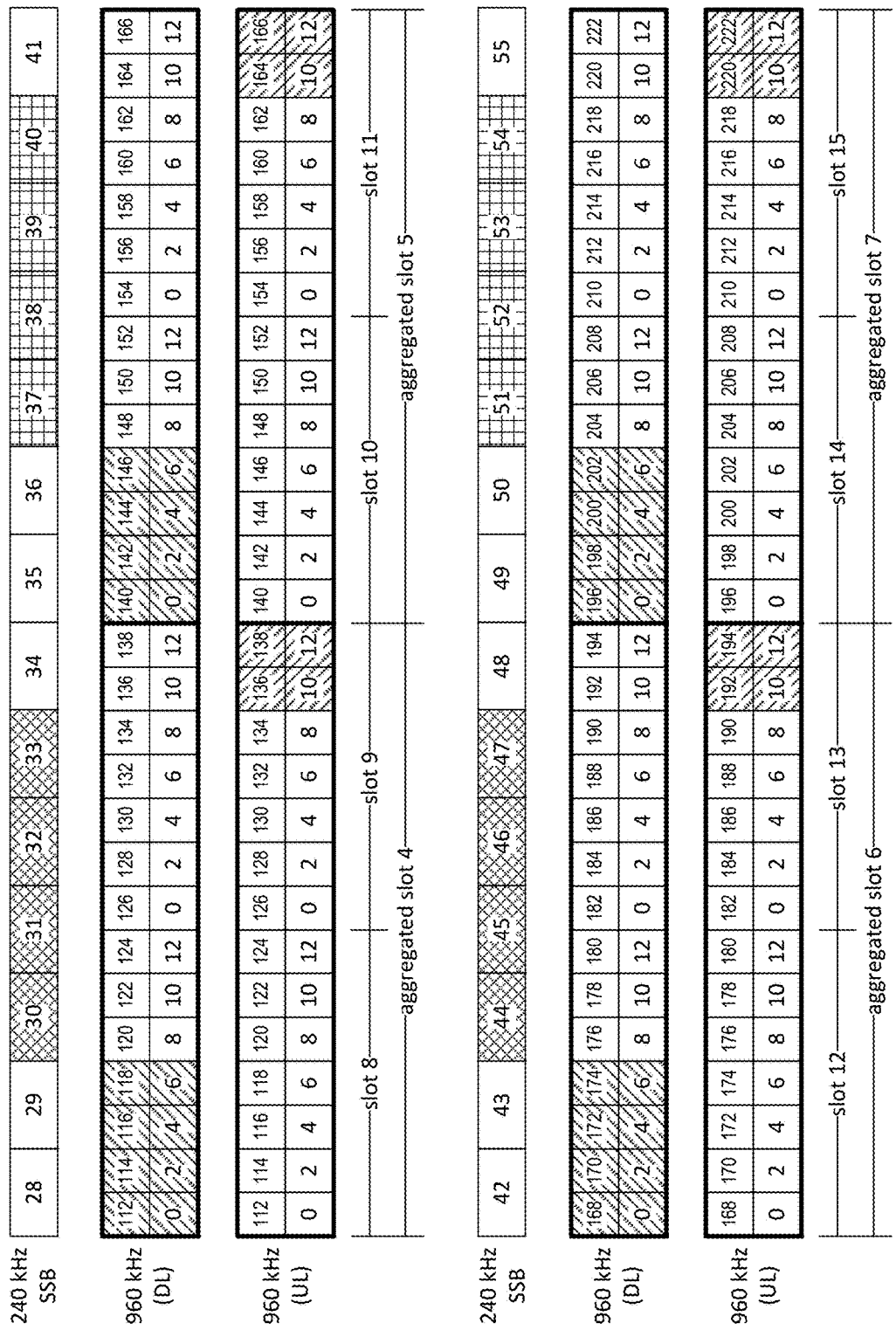

FIGS. 10A and 10B show the novel SSB pattern for a 240 kHz SCS over four consecutive 14-symbol slots as shown in the example of FIGS. 9A and 9B. FIGS. 10A and 10B also show an example of DL (CORESET) and UL (PUCCH) transmissions over the same time period at 960 kHz SCS. The 224 symbols of the 16 corresponding slots in the time period are labeled in order of time, with the top row for each transmission showing a relative slot index of from 0 to 222, and the bottom row showing an absolute slot index of from 0 to 13 which repeats sixteen times. For 960 kHz SCS for control/data, scheduling may be performed using two-slot aggregation, such that a UE transmitting control/data signals at 960 kHz SCS and monitoring SSBs at 240 kHz SCS expects to be scheduled with slot granularity of multiples of 2 for the duration of an SSB burst. In a first option, a UE may be scheduled with this scheduling granularity for the duration of the BWP for control/data signals. In a second option, a UE may switch to this granularity only during the transmission of an SSB burst.

In the example of FIGS. 10A and 10B, two-slot aggregation is applied such that each slot is aggregated with a neighboring slot to form an aggregated slot. As indicated in these figures, for example, slots 0 and 1 are aggregated to form a first aggregated slot 0, slots 2 and 3 are aggregated to form a second aggregated slot 1, slots 4 and 5 are aggregated to form a third aggregated slot 2, slots 6 and 7 are aggregated to form a fourth aggregated slot 3, slots 8 and 9 are aggregated to form a fifth aggregated slot 4, slots 10 and 11 are aggregated to form a sixth aggregated slot 5, slots 12 and 13 are aggregated to form a seventh aggregated slot 6, and slots 14 and 15 are aggregated to form a eighth aggregated slot 7. In aggregated slot 0, DL (CORESET) transmissions are scheduled to occur in an extended period during the first eight symbols of the aggregated slot, and UL (PUCCH) transmissions are scheduled to occur in an extended period during the last four symbols of the aggregated slot. In aggregated slot 1 (and in subsequent slots during the same SSB burst), DL (CORESET) transmissions are scheduled to occur in an extended period during the first eight symbols of the aggregated slot, and UL (PUCCH) transmissions are scheduled to occur in an extended period during the last four symbols of the aggregated slot. FIGS. 10A and 10B do not show the invalid UL and DL transmissions (e.g., UL at symbols 14-16, 42-44, 70-72, 98-100, 126-128, 154-156, 182-184, and 210-212; DL at 12-13, 40-41, 68-69, 96-97, 124-125, 152-153, 180-181, and 208-209) that would be scheduled under single-slot scheduling.

A device (e.g., a UE or access node) may use a listen-before talk (LBT) procedure to obtain access to an unlicensed medium. In the LBT procedure, the device performs a Clear Channel Assessment (CCA) check (e.g., based on energy detection) in order to determine whether the channel is occupied or clear. If the channel is clear (e.g., the detected energy is below a threshold), then the device may access the channel for a period of time called the Channel Occupancy Time (COT).

As noted above, problems may arise in an unlicensed medium if there is a symbol gap between consecutive SS/PBCH blocks. Depending on the SCS, if there is no transmission, such a gap may result in a loss of the medium to a competing network (whether inter-radio access technology (RAT) or intra-RAT (e.g., 5G vs. Wi-Fi).

For a situation in which LBT is required and short control signaling without LBT is allowed, access node 108 may be configured to use contention-exempt SSB transmission outside the COT (e.g., to transmit the SSBs assuming it has the channel). For a situation in which LBT is required and short control signaling without LBT is not allowed, access node 108 may be configured to use a Discovery Reference Signal (DRS) window to access the channel and obtain a valid COT.

For a case that is within the COT, access node 108 may be configured to schedule UL transmission (e.g., PUCCH) in the symbol directly after the end of an SS-PBCH transmission. For example, it may be desired to configure access node 108 to schedule UL transmission (e.g., PUCCH) in the symbol directly after the end of each SS-PBCH transmission for a duration of an SSB burst. For a case that is within the COT, access node 108 may be configured to schedule DL transmission (e.g., CSI-RS, CORESET) in other symbols (e.g., second and third symbols) after the end of an SS-PBCH transmission. For example, it may be desired to configured access node 108 to schedule DL transmission (e.g., CSI-RS, CORESET) in such other symbols (e.g., second and third symbols) after the end of each SS-PBCH transmission for a duration of an SSB burst.

FIGS. 11-14 present a number of operation flows/algorithmic structures in accordance with aspects of this disclosure. These operation flow/algorithmic structures describe a number of operations in a particular sequence. However, the presented sequences are not restrictive. That is, the operations may be performed in sequences other than those specifically presented.

Figure 11:
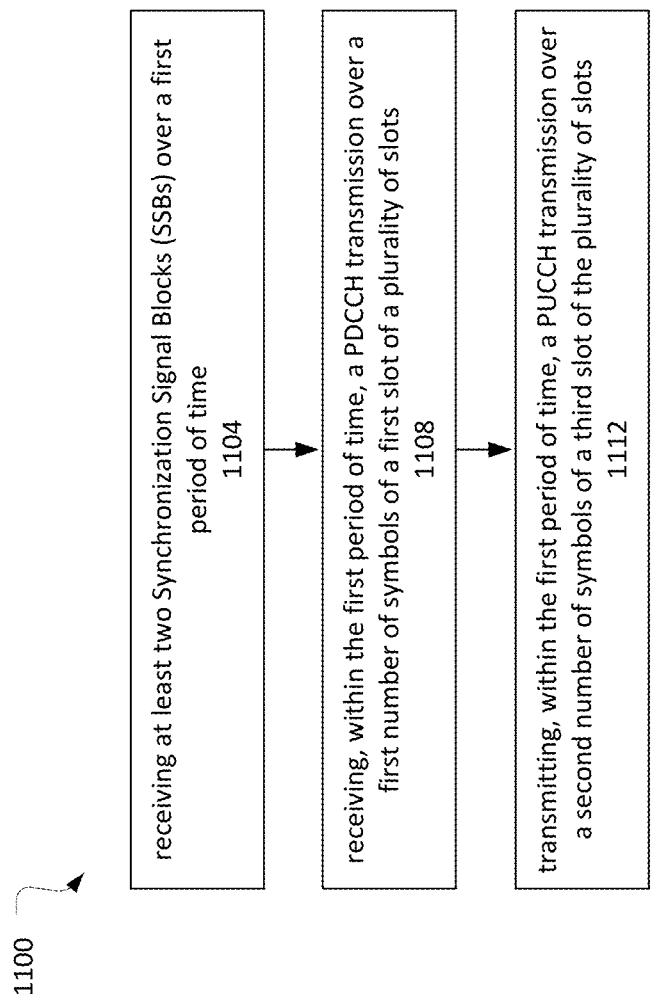
FIG. 11 illustrates an operational flow/algorithmic structure (e.g., as may be performed or implemented by a UE) in accordance with some embodiments.

FIG. 11 illustrates an operational flow/algorithmic structure 1100 in accordance with some embodiments. The operation flow/algorithmic structure 1100 may be performed or implemented by a UE such as, for example, UE 102, 104, 106 or 1500; or components thereof, for example, baseband processor 1504A.

The operation flow/algorithmic structure 1100 may include, at 1104, receiving at least two Synchronization Signal Blocks (SSBs) over a first period of time. In some aspects, the at least two SSBs may have 120 kHz or 240 kHz subcarrier spacing.

The operation flow/algorithmic structure 1100 may include, at 1108, receiving, within the first period of time, a Physical Downlink Control Channel (PDCCH) transmission over a first number of symbols of a first slot of a plurality of slots. In some aspects, the first number of symbols may be equal to or greater than five and/or the PDCCH transmission may schedule data in a second slot of the plurality of slots.

The operation flow/algorithmic structure 1100 may include, at 1112, transmitting, within the first period of time, a Physical Uplink Control Channel (PUCCH) transmission over a second number of symbols of a third slot of the plurality of slots. In some aspects, the second number of symbols may be equal to or greater than three, the PDCCH and PUCCH transmissions may have 480 or 960 kHz subcarrier spacing, the second slot may be different from the first slot, and/or the third slot may be different from or the same as the second slot.

Figure 12:
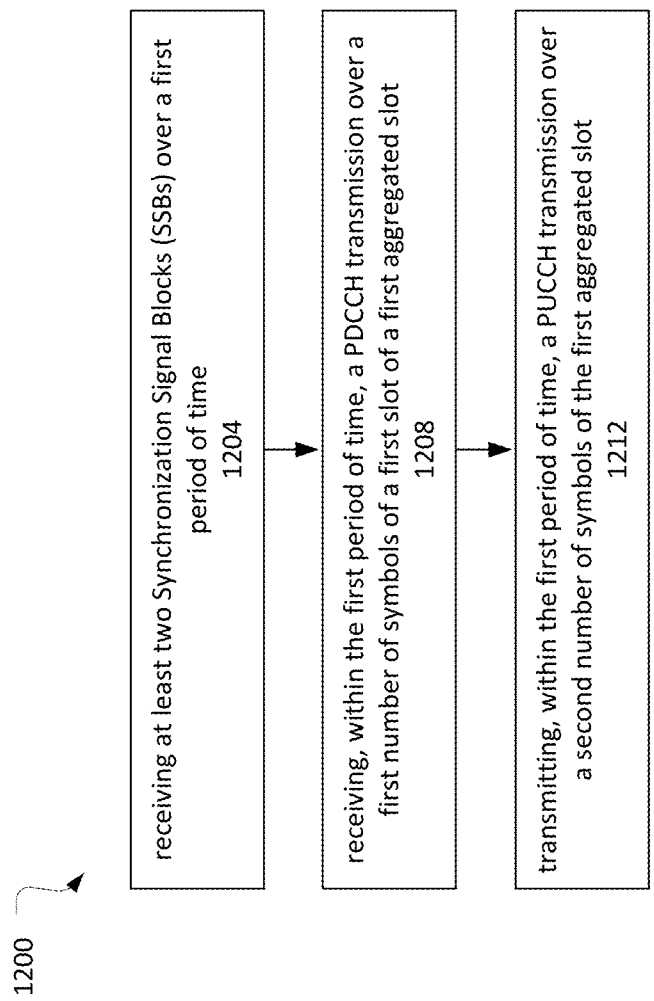
FIG. 12 illustrates an operational flow/algorithmic structure (e.g., as may be performed or implemented by a UE) in accordance with some embodiments.

FIG. 12 illustrates an operational flow/algorithmic structure 1200 in accordance with some embodiments. The operation flow/algorithmic structure 1200 may be performed or implemented by a UE such as, for example, UE 102, 104, 106, or 1500; or components thereof, for example, baseband processor 1504A.

The operation flow/algorithmic structure 1200 may include, at 1204, receiving at least two Synchronization Signal Blocks (SSBs) over a first period of time. In some aspects, the at least two SSBs may have 120 kHz or 240 kHz subcarrier spacing.

The operation flow/algorithmic structure 1200 may include, at 1208, receiving, within the first period of time, a Physical Downlink Control Channel (PDCCH) transmission over a first number of symbols of a first aggregated slot. In some aspects, the first aggregated slot may comprise at least one slot, the first number of symbols may be equal to or greater than four, and/or the PDCCH transmission may be to schedule data in the first aggregated slot.

The operation flow/algorithmic structure 1200 may include, at 1212, transmitting, within the first period of time, a Physical Uplink Control Channel (PUCCH) transmission over a second number of symbols of the first aggregated slot. In some aspects, the second number of symbols may be equal to or greater than two and/or the PDCCH and PUCCH transmissions may have 480 or 960 kHz subcarrier spacing.

Figure 13:
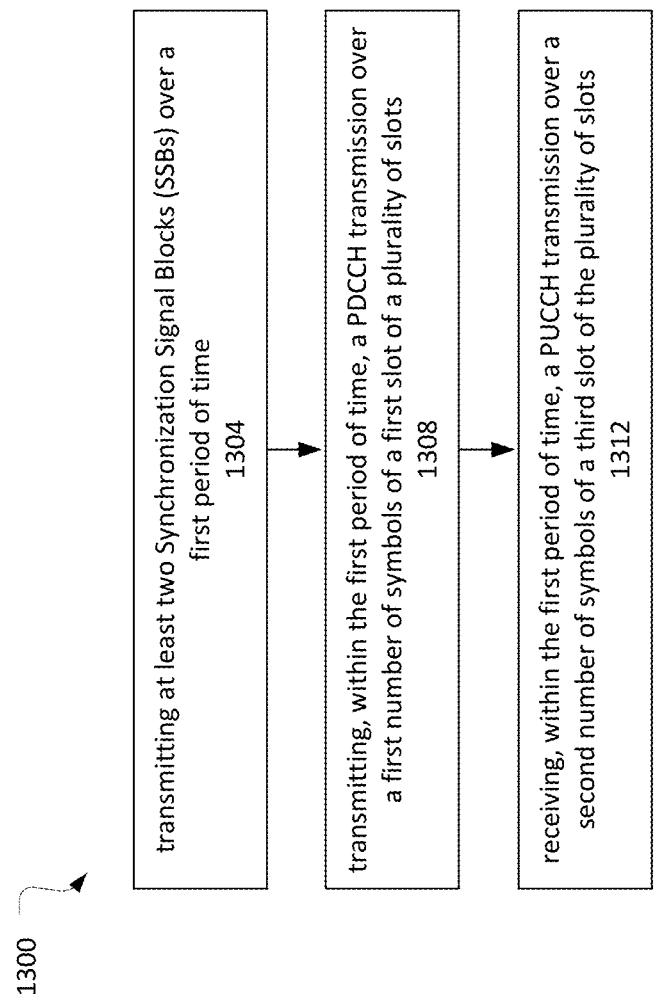
FIG. 13 illustrates an operational flow/algorithmic structure (e.g., as may be performed or implemented by an access node) in accordance with some embodiments.

FIG. 13 illustrates an operational flow/algorithmic structure 1300 in accordance with some embodiments. The operation flow/algorithmic structure 1300 may be performed or implemented by an access node such as, for example, access node 108 or 1600; or components thereof, for example, baseband processor 1604A.

The operation flow/algorithmic structure 1300 may include, at 1304, transmitting at least two Synchronization Signal Blocks (SSBs) over a first period of time. In some aspects, the at least two SSBs may have 120 kHz or 240 kHz subcarrier spacing.

The operation flow/algorithmic structure 1300 may include, at 1308, transmitting, within the first period of time, a Physical Downlink Control Channel (PDCCH) transmission over a first number of symbols of a first slot of a plurality of slots. In some aspects, the first number of symbols may be equal to or greater than five and/or the PDCCH transmission may be to schedule data in a second slot of the plurality of slots.

The operation flow/algorithmic structure 1300 may include, at 1312, receiving, within the first period of time, a Physical Uplink Control Channel (PUCCH) transmission over a second number of symbols of a third slot of the plurality of slots. In some aspects, the second number of symbols may be equal to or greater than three, the PDCCH and PUCCH transmissions may have 480 or 960 kHz subcarrier spacing, the second slot may be different from the first slot, and/or the third slot may be different from or the same as the second slot.

Figure 14:
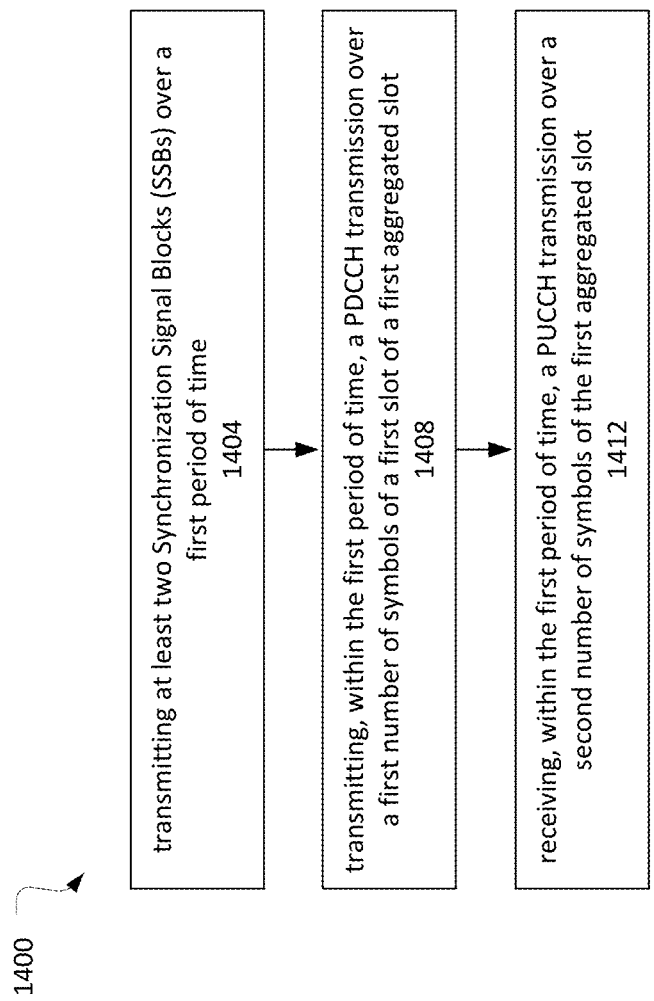
FIG. 14 illustrates an operational flow/algorithmic structure (e.g., as may be performed or implemented by an access node) in accordance with some embodiments.

FIG. 14 illustrates an operational flow/algorithmic structure 1400 in accordance with some embodiments. The operation flow/algorithmic structure 1400 may be performed or implemented by an access node such as, for example, access node 108 or 1600; or components thereof, for example, baseband processor 1604A.

The operation flow/algorithmic structure 1400 may include, at 1404, transmitting at least two Synchronization Signal Blocks (SSBs) over a first period of time. In some aspects, the at least two SSBs may have 120 kHz or 240 kHz subcarrier spacing.

The operation flow/algorithmic structure 1400 may include, at 1408, transmitting, within the first period of time, a Physical Downlink Control Channel (PDCCH) transmission over a first number of symbols of a first aggregated slot. In some aspects, the first aggregated slot may comprise at least one slot, the first number of symbols may be equal to or greater than four, and/or the PDCCH transmission may be to schedule data in the first aggregated slot.

The operation flow/algorithmic structure 1400 may include, at 1412, receiving, within the first period of time, a Physical Uplink Control Channel (PUCCH) transmission over a second number of symbols of the first aggregated slot. In some aspects, the second number of symbols may be equal to or greater than two and/or the PDCCH and PUCCH transmissions may have 480 or 960 kHz subcarrier spacing.

Figure 15:
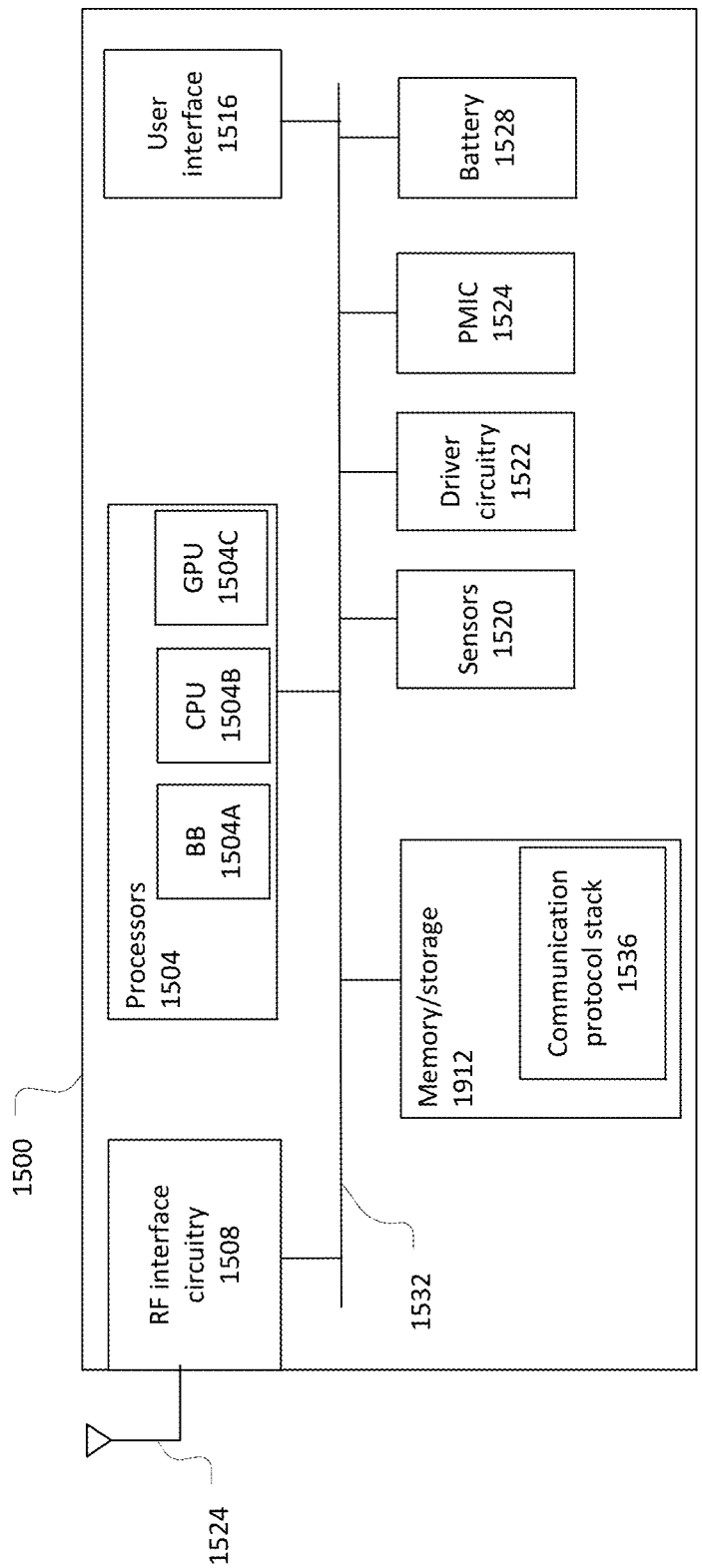
FIG. 15 illustrates a user equipment (UE) in accordance with some embodiments.

FIG. 15 illustrates a UE 1500 in accordance with some embodiments. The UE 1500 may be similar to and substantially interchangeable with UEs 102, 104, or 106.

The UE 1500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1500 may include processors 1504, RF interface circuitry 1508, memory/storage 1512, user interface 1516, sensors 1520, driver circuitry 1522, power management integrated circuit (PMIC) 1524, antenna structure 1526, and battery 1528. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the UE 1500. However, some of the components shown may be omitted, additional components may be present, and different arrangement of the components shown may occur in other implementations.

The components of the UE 1500 may be coupled with various other components over one or more interconnects 1532, which may represent any type of interface, input/output, bus (local, system, or expansion), transmission line, trace, optical connection, etc. that allows various circuit components (on common or different chips or chipsets) to interact with one another.

The processors 1504 may include processor circuitry such as, for example, baseband processor circuitry (BB) 1504A, central processor unit circuitry (CPU) 1504B, and graphics processor unit circuitry (GPU) 1504C. The processors 1504 may include any type of circuitry or processor circuitry that executes or otherwise operates computer-executable instructions, such as program code, software modules, or functional processes from memory/storage 1512 to cause the UE 1500 to perform operations as described herein.

In some embodiments, the baseband processor circuitry 1504A may access a communication protocol stack 1536 in the memory/storage 1512 to communicate over a 3GPP compatible network. In general, the baseband processor circuitry 1504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1508.

The baseband processor circuitry 1504A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1512 may include one or more non-transitory, computer-readable media that includes instructions (for example, communication protocol stack 1536) that may be executed by one or more of the processors 1504 to cause the UE 1500 to perform various operations described herein. The memory/storage 1512 may also store CSI IMR, reporting, and rate pattern configuration information as described elsewhere.

The memory/storage 1512 include any type of volatile or non-volatile memory that may be distributed throughout the UE 1500. In some embodiments, some of the memory/storage 1512 may be located on the processors 1504 themselves (for example, L1 and L2 cache), while other memory/storage 1512 is external to the processors 1504 but accessible thereto via a memory interface. The memory/storage 1512 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1508 may include transceiver circuitry and radio frequency front module (RFEM) that allows the UE 1500 to communicate with other devices over a radio access network. The RF interface circuitry 1508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1526 and proceed to filter and amplify (with a low-noise amplifier) the signal. The signal may be provided to a receiver of the transceiver that down-converts the RF signal into a baseband signal that is provided to the baseband processor of the processors 1504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1526.

In various embodiments, the RF interface circuitry 1508 may be configured to transmit/receive signals in a manner compatible with NR access technologies.

The antenna 1526 may include antenna elements to convert electrical signals into radio waves to travel through the air and to convert received radio waves into electrical signals. The antenna elements may be arranged into one or more antenna panels. The antenna 1526 may have antenna panels that are omnidirectional, directional, or a combination thereof to enable beamforming and multiple input, multiple output communications. The antenna 1526 may include microstrip antennas, printed antennas fabricated on the surface of one or more printed circuit boards, patch antennas, phased array antennas, etc. The antenna 1526 may have one or more panels designed for specific frequency bands including bands in FR1 or FR2.

The user interface circuitry 1516 includes various input/output (I/O) devices designed to enable user interaction with the UE 1500. The user interface 1516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays or "LCDs," LED displays, quantum dot displays, projectors, etc.), with the output of characters, graphics, multimedia objects, and the like being generated or produced from the operation of the UE 1500.

The sensors 1520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1522 may include software and hardware elements that operate to control particular devices that are embedded in the UE 1500, attached to the UE 1100, or otherwise communicatively coupled with the UE 1500. The driver circuitry 1522 may include individual drivers allowing other components to interact with or control various input/output (I/O) devices that may be present within, or connected to, the UE 1500. For example, driver circuitry 1522 may include a display driver to control and allow access to a display device, a touchscreen driver to control and allow access to a touchscreen interface, sensor drivers to obtain sensor readings of sensor circuitry 1520 and control and allow access to sensor circuitry 1520, drivers to obtain actuator positions of electro-mechanic components or control and allow access to the electro-mechanic components, a camera driver to control and allow access to an embedded image capture device, audio drivers to control and allow access to one or more audio devices.

The PMIC 1524 may manage power provided to various components of the UE 1500. In particular, with respect to the processors 1504, the PMIC 1524 may control power-source selection, voltage scaling, battery charging, or DC-to-DC conversion.

A battery 1528 may power the UE 1500, although in some examples the UE 1500 may be mounted deployed in a fixed location, and may have a power supply coupled to an electrical grid. The battery 1528 may be a lithium ion battery, a metal-air battery, such as a zinc-air battery, an aluminum-air battery, a lithium-air battery, and the like. In some implementations, such as in vehicle-based applications, the battery 1528 may be a typical lead-acid automotive battery.

Figure 16:
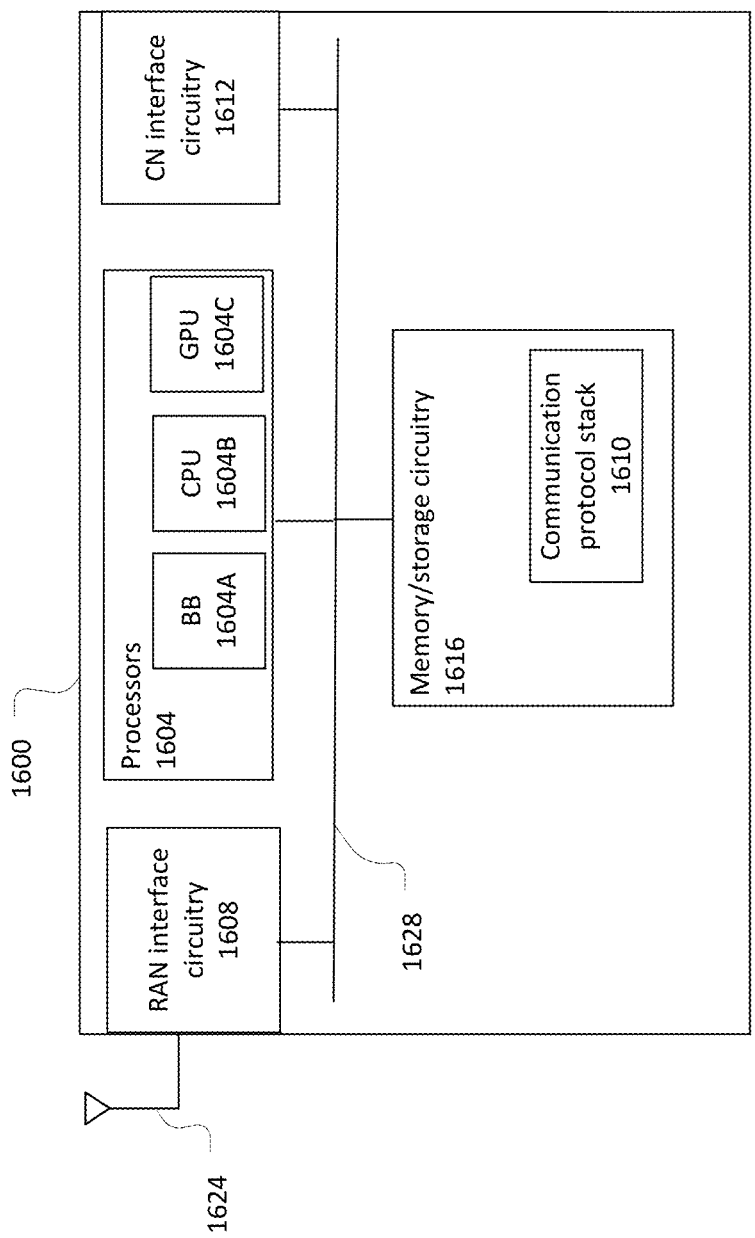
FIG. 16 illustrates an access node in accordance with some embodiments.

FIG. 16 illustrates an access node 1600 (e.g., a gNB) in accordance with some embodiments. The access node 1600 may similar to and substantially interchangeable with access node 108.

The access node 1600 may include processors 1604, RF interface circuitry 1608, core network (CN) interface circuitry 1612, memory/storage circuitry 1616, and antenna structure 1626.

The components of the access node 1600 may be coupled with various other components over one or more interconnects 1628.

The processors 1604, RF interface circuitry 1608, memory/storage circuitry 1616 (including communication protocol stack 1610), antenna structure 1626, and interconnects 1628 may be similar to like-named elements shown and described with respect to FIG. 14.

The CN interface circuitry 1612 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the access node 1600 via a fiber optic or wireless backhaul. The CN interface circuitry 1612 may include one or more dedicated processors or FPGAs to communicate using one or more of the aforementioned protocols. In some implementations, the CN interface circuitry 1612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 includes a method of operating a UE, the method comprising receiving at least two Synchronization Signal Blocks (SSBs) over a first period of time, the at least two SSBs having 120 kHz or 240 kHz subcarrier spacing; receiving, within the first period of time, a Physical Downlink Control Channel (PDCCH) transmission over a first number of symbols of a first slot of a plurality of slots, the PDCCH transmission to schedule data in a second slot of the plurality of slots; and transmitting, within the first period of time, a Physical Uplink Control Channel (PUCCH) transmission over a second number of symbols of a third slot of the plurality of slots, the second number of symbols being equal to or greater than three, wherein the PDCCH and PUCCH transmissions have 480 or 960 kHz subcarrier spacing, the second slot is different from the first slot, and the third slot is different from or the same as the second slot.

Example 2 includes the method of example 1 or some other example herein, wherein the at least two SSBs are transmitted with an SSB pattern that includes three symbols between adjacent SSBs.

Example 3 includes the method of example 2 or some other example herein, further comprising receiving the PDCCH transmission or transmitting the PUCCH transmission within a time period that corresponds to the three symbols between adjacent SSBs.

Example 4 includes the method of example 1 or some other example herein, wherein the first number of symbols is a sequence of consecutive symbols, and wherein the second number of symbols is a sequence of consecutive symbols.

Example 5 includes the method of any of examples 1 to 4 or some other example herein, wherein the first and second slots are within an aggregated slot that is an aggregation of at least two slots.

Example 6 includes the method of example 5 or some other example herein, wherein the third slot is within an aggregated slot that includes the third slot and a fourth slot, and wherein the PUCCH transmission includes feedback information with respect to data received in the fourth slot.

Example 7 includes the method of example 5 or some other example herein, wherein a first of the at least two SSBs occurs within the first aggregated slot, and a second of the at least two SSBs occurs within the second aggregated slot.

Example 8 includes the method of example 5 or some other example herein, wherein the second number of symbols includes a symbol that occurs directly after an end of one of the at least two SSBs.

Example 9 includes the method of example 5 or some other example herein, wherein the first number of symbols includes a symbol that is the second symbol occurring directly after an end of one of the at least two SSBs.

Example 10 includes a method of operating a UE, the method comprising receiving at least two Synchronization Signal Blocks (SSBs) over a first period of time, the at least two SSBs having 120 kHz or 240 kHz subcarrier spacing; receiving, within the first period of time, a Physical Downlink Control Channel (PDCCH) transmission over a first number of symbols of a first aggregated slot that comprises at least one slot, the first number of symbols being equal to or greater than four, the PDCCH transmission to schedule data in the first aggregated slot; and transmitting, within the first period of time, a Physical Uplink Control Channel (PUCCH) transmission over a second number of symbols of the first aggregated slot, the second number of symbols being equal to or greater than two, wherein the PDCCH and PUCCH transmissions have 480 or 960 kHz subcarrier spacing.

Example 11 includes the method of example 10 or some other example herein, wherein the first number of symbols is a sequence of consecutive symbols, and wherein the second number of symbols is a sequence of consecutive symbols.

Example 12 includes the method of example 10 or some other example herein, wherein the second number of symbols includes a symbol that occurs directly after the end of the one of the at least two SSBs.

Example 13 includes the method of example 10 or some other example herein, wherein the at least two SSBs are transmitted with an SSB pattern that includes a gap between adjacent SSBs.

Example 14 includes the method of example 13 or some other example herein, further comprising receiving the PDCCH transmission or transmitting the PUCCH transmission within a time period that corresponds to the gap between adjacent SSBs.

Example 15 includes the method of example 13 or some other example herein, further comprising transmitting the PUCCH transmission within a time period that corresponds to the gap between adjacent SSBs; and receiving a second PDCCH transmission within a time period that corresponds to the gap between adjacent SSBs.

Example 16 includes the method of example 10 or some other example herein, wherein the PDCCH transmission is to schedule data in at least two slots of the first aggregated slot.

Example 17 includes the method of any of examples 10 to 16 or some other example herein, wherein a first of the at least two SSBs begins at a first time offset from the start of the first aggregated slot, and wherein a second of the at least two SSBs begins at a second time offset from the start of a second aggregated slot that immediately follows the first aggregated slot, and wherein the first time offset is equal to the second time offset.

Example 18 includes a method of operating an access node (e.g., a gNB), the method comprising transmitting at least two Synchronization Signal Blocks (SSBs) over a first period of time, the at least two SSBs having 120 kHz or 240 kHz subcarrier spacing; transmitting to a user equipment (UE), within the first period of time, a Physical Downlink Control Channel (PDCCH) transmission over a first number of symbols of a first aggregated slot that comprises at least one slot, the first number of symbols being equal to or greater than four, the PDCCH transmission to schedule data in the first aggregated slot; and receiving from the UE, within the first period of time, a Physical Uplink Control Channel (PUCCH) transmission over a second number of symbols of the first aggregated slot, the second number of symbols being equal to or greater than two, wherein the PDCCH and PUCCH transmissions have 480 or 960 kHz subcarrier spacing.

Example 19 includes the method of example 18 or some other example herein, wherein the first number of symbols is a sequence of consecutive symbols, and wherein the second number of symbols is a sequence of consecutive symbols.

Example 20 includes the method of example 18 or some other example herein, wherein the second number of symbols includes a symbol that occurs directly after the end of the one of the at least two SSBs.

Example 21 includes the method of example 18 or some other example herein, wherein the at least two SSBs are transmitted with an SSB pattern that includes a gap between adjacent SSBs.

Example 22 includes the method of example 21 or some other example herein, wherein the receiving the PDCCH transmission or the transmitting the PUCCH transmission is performed within a time period that corresponds to the gap between adjacent SSBs.

Example 23 includes the method of example 18 or some other example herein, comprising transmitting the PUCCH transmission within a time period that corresponds to the gap between adjacent SSBs; and receiving a second PDCCH transmission within a time period that corresponds to the gap between adjacent SSBs.

Example 24 includes the method of example 18 or some other example herein, comprising scheduling a PUCCH transmission by the UE to occur over a period that includes a symbol that is directly after the end of one of the at least two SSBs.

Example 25 includes the method of example 18 or some other example herein, comprising transmitting a PDCCH transmission by the UE over a period that includes a symbol that is the second symbol directly after the end of one of the at least two SSBs.

Example 26 includes the method of example 18 or some other example herein, comprising transmitting at least a first SSB of the at least two SSBs over a channel in unlicensed spectrum and in the absence of a valid channel occupancy time for the channel.

Example 27 includes the method of example 18 or some other example herein, comprising obtaining a valid channel occupancy time for a channel in unlicensed spectrum, and transmitting the at least two SSBs over the channel within the valid channel occupancy time.

Example 28 includes the method of any of examples 18 to 27 or some other example herein, wherein a first of the at least two SSBs begins at a first time offset from the start of the first aggregated slot, and wherein a second of the at least two SSBs begins at a second time offset from the start of a second aggregated slot that immediately follows the first aggregated slot, and wherein the first time offset is equal to the second time offset.

Example 29 includes a method of operating an access node (e.g., a gNB), the method comprising transmitting at least two Synchronization Signal Blocks (SSBs) over a first period of time, the at least two SSBs having 120 kHz or 240 kHz subcarrier spacing; transmitting to a user equipment (UE), within the first period of time, a Physical Downlink Control Channel (PDCCH) transmission over a first number of symbols of a first slot of a plurality of slots, the PDCCH transmission to schedule data in a second slot of the plurality of slots; and receiving from the UE, within the first period of time, a Physical Uplink Control Channel (PUCCH) transmission over a second number of symbols of a third slot of the plurality of slots, the second number of symbols being equal to or greater than three, wherein the PDCCH and PUCCH transmissions have 480 or 960 kHz subcarrier spacing, the second slot is different from the first slot, and the third slot is different from or the same as the second slot.

Example 30 may include an apparatus comprising means to perform one or more elements of a method described in or related to any of examples 1-29, or any other method or process described herein.

Example 31 may include one or more non-transitory computer-readable media comprising instructions to cause an electronic device, upon execution of the instructions by one or more processors of the electronic device, to perform one or more elements of a method described in or related to any of examples 1-29, or any other method or process described herein.

Example 32 may include an apparatus comprising logic, modules, or circuitry to perform one or more elements of a method described in or related to any of examples 1-29, or any other method or process described herein.

Example 33 may include a method, technique, or process as described in or related to any of examples 1-29, or portions or parts thereof.

Example 34 may include an apparatus comprising: one or more processors and one or more computer-readable media comprising instructions that, when executed by the one or more processors, cause the one or more processors to perform the method, techniques, or process as described in or related to any of examples 1-29, or portions thereof.

Example 35 may include a signal as described in or related to any of examples 1-29, or portions or parts thereof.

Example 36 may include a datagram, information element, packet, frame, segment, PDU, or message as described in or related to any of examples 1-29, or portions or parts thereof, or otherwise described in the present disclosure.

Example 37 may include a signal encoded with data as described in or related to any of examples 1-29, or portions or parts thereof, or otherwise described in the present disclosure.

Example 38 may include a signal encoded with a datagram, IE, packet, frame, segment, PDU, or message as described in or related to any of examples 1-29, or portions or parts thereof, or otherwise described in the present disclosure.

Example 39 may include an electromagnetic signal carrying computer-readable instructions, wherein execution of the computer-readable instructions by one or more processors is to cause the one or more processors to perform the method, techniques, or process as described in or related to any of examples 1-29, or portions thereof.

Example 40 may include a computer program comprising instructions, wherein execution of the program by a processing element is to cause the processing element to carry out the method, techniques, or process as described in or related to any of examples 1-29, or portions thereof.

Example 41 may include a signal in a wireless network as shown and described herein.

Example 42 may include a method of communicating in a wireless network as shown and described herein.

Example 43 may include a system for providing wireless communication as shown and described herein.

Example 44 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor comprising:
processing circuitry configured to:
process at least two Synchronization Signal Blocks (SSBs) over a first period of time, the at least two SSBs having 120 kHz or 240 kHz subcarrier spacing;
process, within the first period of time and before receiving one of the at least two SSBs, a Physical Downlink Control Channel (PDCCH) transmission over a first number of symbols of a first aggregated slot that comprises at least one slot, the first number of symbols being equal to or greater than four, the PDCCH transmission to schedule data in the first aggregated slot; and
generate, within the first period of time and after receiving the one of the at least two SSBs, a Physical Uplink Control Channel (PUCCH) transmission over a second number of symbols of the first aggregated slot, the second number of symbols being equal to or greater than two,
wherein the PDCCH and PUCCH transmissions have 480 or 960 kHz subcarrier spacing; and
interface ciruitry to communicatively coupled the processing circuitry to a component of a device.

2. The baseband processor of claim 1, wherein the first number of symbols is a sequence of consecutive symbols, and wherein the second number of symbols is a sequence of consecutive symbols.

3. The baseband processor of claim 1, wherein the at least two SSBs are transmitted with an SSB pattern that includes a gap between adjacent SSBs, and
wherein the processing circuitry is further configured to:
generate the PUCCH transmission within a time period that corresponds to the gap between adjacent SSBs; and
process a second PDCCH transmission within a time period that corresponds to the gap between adjacent SSBs.

4. The baseband processor of claim 1, wherein the PDCCH transmission is to schedule data in at least two slots of the first aggregated slot.

5. The baseband processor of claim 1, wherein a first of the at least two SSBs begins at a first time offset from a start of the first aggregated slot, and
wherein a second of the at least two SSBs begins at a second time offset from a start of a second aggregated slot that immediately follows the first aggregated slot, and
wherein the first time offset is equal to the second time offset.

6. One or more non-transitory computer-readable media having instructions that are to be executed to cause processing circuitry to:
generate at least two Synchronization Signal Blocks (SSBs) over a first period of time, the at least two SSBs having 120 kHz or 240 kHz subcarrier spacing;
generate, within the first period of time and before transmitting one of the at least two SSBs, a Physical Downlink Control Channel (PDCCH) transmission over a first number of symbols of a first aggregated slot that comprises at least one slot, the first number of symbols being equal to or greater than four, the PDCCH transmission to schedule data in the first aggregated slot; and
process within the first period of time and after transmitting the one of the at least two SSBs, a Physical Uplink Control Channel (PUCCH) transmission over a second number of symbols of the first aggregated slot, the second number of symbols being equal to or greater than two,
wherein the PDCCH and PUCCH transmissions have 480 or 960 kHz subcarrier spacing.

7. The one or more non-transitory computer-readable media of claim 6, wherein the first number of symbols is a sequence of consecutive symbols, and wherein the second number of symbols is a sequence of consecutive symbols.

8. The one or more non-transitory computer-readable media of claim 6, wherein the second number of symbols includes a symbol that occurs directly after an end of the one of the at least two SSBs.

9. The one or more non-transitory computer-readable media of claim 6, wherein the at least two SSBs are transmitted with an SSB pattern that includes a gap between adjacent SSBs, and
wherein the instructions are to be executed to further cause the processing circuitry to:
generate the PUCCH transmission within a time period that corresponds to the gap between adjacent SSBs; and
process a second PDCCH transmission within a time period that corresponds to the gap between adjacent SSBs.

10. The one or more non-transitory computer-readable media of claim 6, wherein the instructions are to be executed to further cause the processing circuitry to:
schedule a PUCCH transmission to occur over a period that includes a symbol that is directly after an end of one of the at least two SSBs.

11. The one or more non-transitory computer-readable media of claim 6, wherein the instructions are to be executed to further cause the processing circuitry to:
generate a PDCCH transmission over a period that includes a symbol that is a second symbol directly after an end of one of the at least two SSBs.

12. The one or more non-transitory computer-readable media of claim 6, wherein the instructions are to be executed to further cause the processing circuitry to:
generate at least a first SSB of the at least two SSBs over a channel in unlicensed spectrum and in an absence of a valid channel occupancy time for the channel.

13. The one or more non-transitory computer-readable media of claim 6, wherein the instructions, are to be executed to further cause the processing circuitry to:
obtain a valid channel occupancy time for a channel in unlicensed spectrum, and generate the at least two SSBs over the channel within the valid channel occupancy time.

14. The one or more non-transitory computer-readable media of claim 6, wherein a first of the at least two SSBs begins at a first time offset from a start of the first aggregated slot, and wherein a second of the at least two SSBs begins at a second time offset from a start of a second aggregated slot that immediately follows the first aggregated slot, and wherein the first time offset is equal to the second time offset.

15. A method comprising:

generating at least two Synchronization Signal Blocks (SSBs) over a first period of time, the at least two SSBs having 120 kHz or 240 kHz subcarrier spacing;

generating, within the first period of time and before transmitting one of the at least two SSBs, a Physical Downlink Control Channel (PDCCH) transmission over a first number of symbols of a first aggregated slot that comprises at least one slot, the first number of symbols being equal to or greater than four, the PDCCH transmission to schedule data in the first aggregated slot; and processing within the first period of time and after transmitting the one of the at least two SSBs, a Physical Uplink Control Channel (PUCCH) transmission over a second number of symbols of the first aggregated slot, the second number of symbols being equal to or greater than two, wherein the PDCCH and PUCCH transmissions have 480 or 960 kHz subcarrier spacing.

16. The method of claim 15, wherein the first number of symbols is a sequence of consecutive symbols, and wherein the second number of symbols is a sequence of consecutive symbols.

17. The method of claim 15, wherein the second number of symbols includes a symbol that occurs directly after an end of the one of the at least two SSBs.

18. The method of claim 15, wherein the at least two SSBs are transmitted with an SSB pattern that includes a gap between adjacent SSBs, and the method further comprises:

generating the PUCCH transmission within a time period that corresponds to the gap between adjacent SSBs; and processing a second PDCCH transmission within a time period that corresponds to the gap between adjacent SSBs.

19. The method of claim 15, further comprising:

scheduling a PUCCH transmission to occur over a period that includes a symbol that is directly after an end of one of the at least two SSBs.

20. The method of claim 15, further comprising:

generating a PDCCH transmission over a period that includes a symbol that is a second symbol directly after an end of one of the at least two SSBs.

* * * * *